United States Patent
Fukagai

(10) Patent No.: US 10,672,131 B2
(45) Date of Patent: Jun. 2, 2020

(54) CONTROL METHOD, NON-TRANSITORY COMPUTER-READABLE STORAGE MEDIUM, AND CONTROL APPARATUS

(71) Applicant: FUJITSU LIMITED, Kawasaki-shi, Kanagawa (JP)

(72) Inventor: Takuya Fukagai, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 97 days.

(21) Appl. No.: 16/054,188

(22) Filed: Aug. 3, 2018

(65) Prior Publication Data

US 2019/0050994 A1     Feb. 14, 2019

(30) Foreign Application Priority Data

Aug. 10, 2017   (JP) ................................ 2017-155263

(51) Int. Cl.
    *G06K 9/62*    (2006.01)
    *G06T 7/20*    (2017.01)
    *G06K 9/32*    (2006.01)

(52) U.S. Cl.
    CPC .............. *G06T 7/20* (2013.01); *G06K 9/3233* (2013.01); *G06K 9/6267* (2013.01); *G06T 2207/10016* (2013.01); *G06T 2207/20084* (2013.01)

(58) Field of Classification Search
    CPC ....... G06T 7/20; G06K 9/6267; G06K 9/3233
    See application file for complete search history.

(56) References Cited

U.S. PATENT DOCUMENTS

| | | | | |
|---|---|---|---|---|
| 5,708,473 | A | * | 1/1998 | Mead ................... H04N 9/8042 375/240.15 |
| 5,845,048 | A | | 12/1998 | Masumoto |
| 6,674,925 | B1 | * | 1/2004 | Schoepflin ................ G06T 7/12 348/169 |
| 8,224,023 | B2 | | 7/2012 | Greig |
| 9,842,255 | B2 | | 12/2017 | Taguchi |

(Continued)

FOREIGN PATENT DOCUMENTS

JP       2008-112210        5/2008

OTHER PUBLICATIONS

Ross Girshick et al., "Rich feature hierarchies for accurate object detection and semantic segmentation", 2014 IEEE Conference on Computer Vision and Pattern Recognition (CVPR), pp. 580-587 (8 pages), 2014.

(Continued)

*Primary Examiner* — Solomon G Bezuayehu
(74) *Attorney, Agent, or Firm* — Fujitsu Patent Center

(57) ABSTRACT

A control method includes: estimating, in a first image within an image series, a plurality of sets including candidate regions and indexes according to image feature quantities of the first image, the candidate regions being regions in which presence of an object is estimated within the first image, the indexes being values indicating possibilities of the presence of the object in the candidate regions; obtaining movement information about movement of the object from the image series; correcting the candidate regions and the indexes in the plurality of sets based on the movement information obtained by the second processing; and determining the position of the object in the first image based on the plurality of sets including the corrected candidate regions and the corrected indexes.

19 Claims, 29 Drawing Sheets

(56) References Cited

U.S. PATENT DOCUMENTS

| | | | |
|---|---|---|---|
| 2007/0097112 A1* | 5/2007 | Greig | G01C 11/04 |
| | | | 345/419 |
| 2016/0104058 A1 | 4/2016 | He et al. | |
| 2018/0232907 A1* | 8/2018 | Sung | G06T 7/80 |
| 2019/0050994 A1 | 2/2019 | Fukagai | |

OTHER PUBLICATIONS

Ross Girshick, "Fast R-CNN", 2015 IEEE International Conference on Computer Vision (ICCV), pp. 1440-1448 (9 pages), 2015.

Shaoqing Ren et al., "Faster R-CNN: Towards Real-Time Object Detection with Region Proposal Networks", Neural Information Processing Systems (NIPS), pp. 1-9 (9 pages), 2015.

Xuan-Phung Huynh et al., "Deep Learning-based Multiple Pedestrians Detection-Tracking Framework", Proceedings of HCI Korea 2016, pp. 55-60 (6 pages), 2016.

Ingemar J. Cox et al., "An Efficient Implementation and Evaluation of Reid's Multiple Hypothesis Tracking Algorithm for Visual Tracking," in ICPR, pp. A:437-A:442 (6 pages), 1994.

Ingemar J. Cox et al., "An Efficient Implementation of Reid's Multiple Hypothesis Tracking Algorithm and Its Evaluation for the Purpose of Visual Tracking", IEEE Transactions on Pattern Analysis and Machine Intelligence, vol. 18, No. 2, pp. 138-150 (13 pages), 1996.

U.S. Office Action dated Feb. 26, 2020 for copending U.S. Appl. No. 16/055,214, 13 pages.

\* cited by examiner

FIG. 17
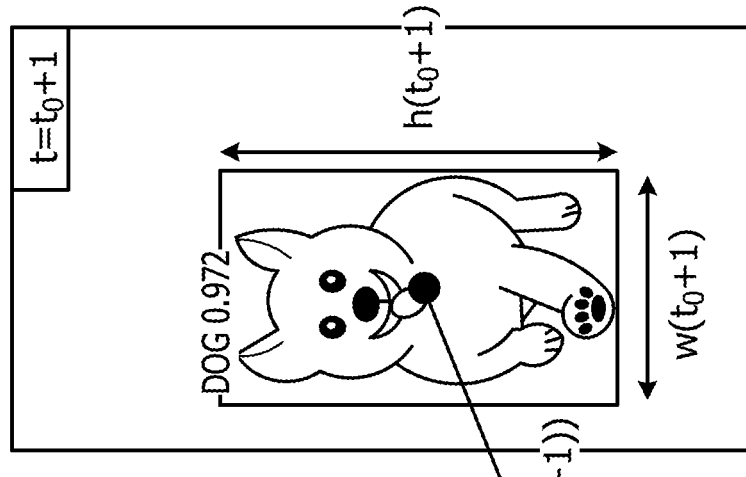
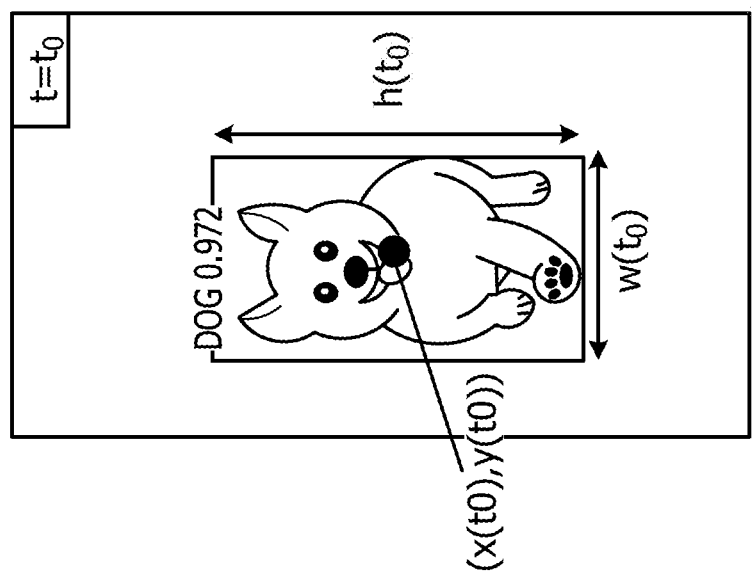

FIG. 19
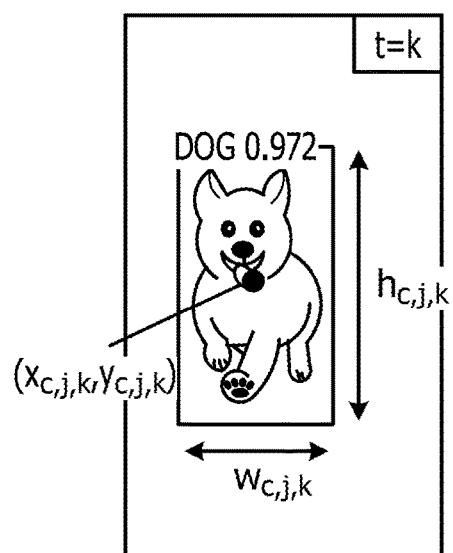
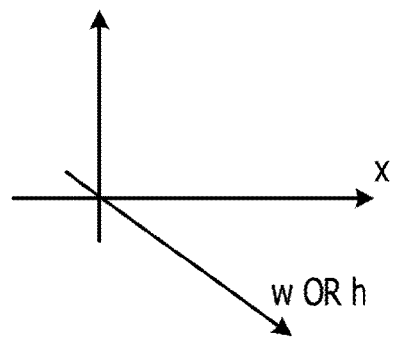

OBSERVATION DATA $$z_{c,i,k} = \begin{bmatrix} x_{c,j,k} \\ y_{c,j,k} \\ w_{c,j,k} \\ h_{c,j,k} \end{bmatrix}$$

SCORE
$p_{c,i,k}$

○ ESTIMATED VALUE CALCULATED IN PREVIOUS FRAME
○ OBSERVED POINT OBTAINED FROM IMAGE IN LATEST FRAME
 (DETECTED REGION BEFORE BEING NARROWED DOWN)

CONTROL METHOD, NON-TRANSITORY COMPUTER-READABLE STORAGE MEDIUM, AND CONTROL APPARATUS

CROSS-REFERENCE TO RELATED APPLICATION

This application is based upon and claims the benefit of priority of the prior Japanese Patent Application No. 2017-155263, filed on Aug. 10, 2017, the entire contents of which are incorporated herein by reference.

FIELD

The embodiment discussed herein is related to a control method, a non-transitory computer-readable storage medium for storing a control program, and a control apparatus.

BACKGROUND

A neural network may be used in information processing, for example, image processing. As an example, the neural network may be used to estimate which object is present at which position in an image or an image series.

There is a Faster R-CNN as a method of estimating the position and kind of an object using the neural network. R-CNN is an abbreviation of regions with convolutional neural network. CNN is an abbreviation of convolutional neural network.

In the Faster R-CNN, a computer estimates a candidate position of an object based on a feature quantity of a still image, and determines the position of the object with a score based on the feature quantity of the still image and the estimated candidate position.

Incidentally, in a related technology, there is a case that a computer tracks movement of an object based on a detected position of the object identified in each still image.

Examples of the related art include U.S. Laid-open Patent Publication No. 2016/0104058, Japanese Laid-open Patent Publication No. 2008-112210, Non-Patent Document 1 ["Rich feature hierarchies for accurate object detection and semantic segmentation," Ross Girshick, Jeff Donahue, Trevor Darrell, Jetendra Malik, IEEE Conference on Computer Vision and Pattern Recognition (CVPR), 2014], Non-Patent Document 2 ["Fast R-CNN," Ross Girshick, IEEE International Conference on Computer Vision (ICCV), 2015], Non-Patent Document 3 ["Faster R-CNN: Towards Real-Time Object Detection with Region Proposal Networks," Shaoqing Ren, Kaiming He, Ross Girshick, and Jian Sun, Neural Information Processing Systems (NIPS), 2015], Non-Patent Document 4 ["Deep Learning-based Multiple Pedestrians Detection-Tracking Framework," Xuan-Phung Huynh, Yong-Guk Kim, Proceedings of HCI Korea 2016, 2016], Non-Patent Document 5 [Ingemar J. Cox and Sunita L. Hingorani, "An efficient implementation and evaluation of reid's multiple hypothesis tracking algorithm for visual tracking," in ICPR, pp. A: 437-442, 1994], and Non-Patent Document 6 [Ingemar J. Cox and Sunita L. Hingorani. An Efficient Implementation of Reid's Multiple Hypothesis Tracking Algorithm and Its Evaluation for the Purpose of Visual Tracking. IEEE Transactions On Pattern Analysis And Machine Intelligence, Vol 18, No. 2, pp. 138-150, 1996.

SUMMARY

According to an aspect of the embodiment, a control method comprising: executing first processing that includes estimating, in a first image within an image series, a plurality of sets including candidate regions and indexes according to image feature quantities of the first image, the candidate regions being regions in which presence of an object is estimated within the first image, the indexes being values indicating possibilities of the presence of the object in the candidate regions; executing second processing that includes obtaining movement information about movement of the object from the image series; and executing third processing that includes correcting the candidate regions and the indexes in the plurality of sets estimated by the first processing based on the movement information obtained by the second processing when determining a position of the object in the first image by using the candidate regions and the indexes in the plurality of sets estimated by the first processing, and determining the position of the object in the first image based on the plurality of sets including the corrected candidate regions and the corrected indexes.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 17 is a diagram illustrating an example of a first method of the predicted region estimation processing;

FIG. 19 is a diagram illustrating an example of a third method of the predicted region estimation processing;

DESCRIPTION OF EMBODIMENT

Figure 1:
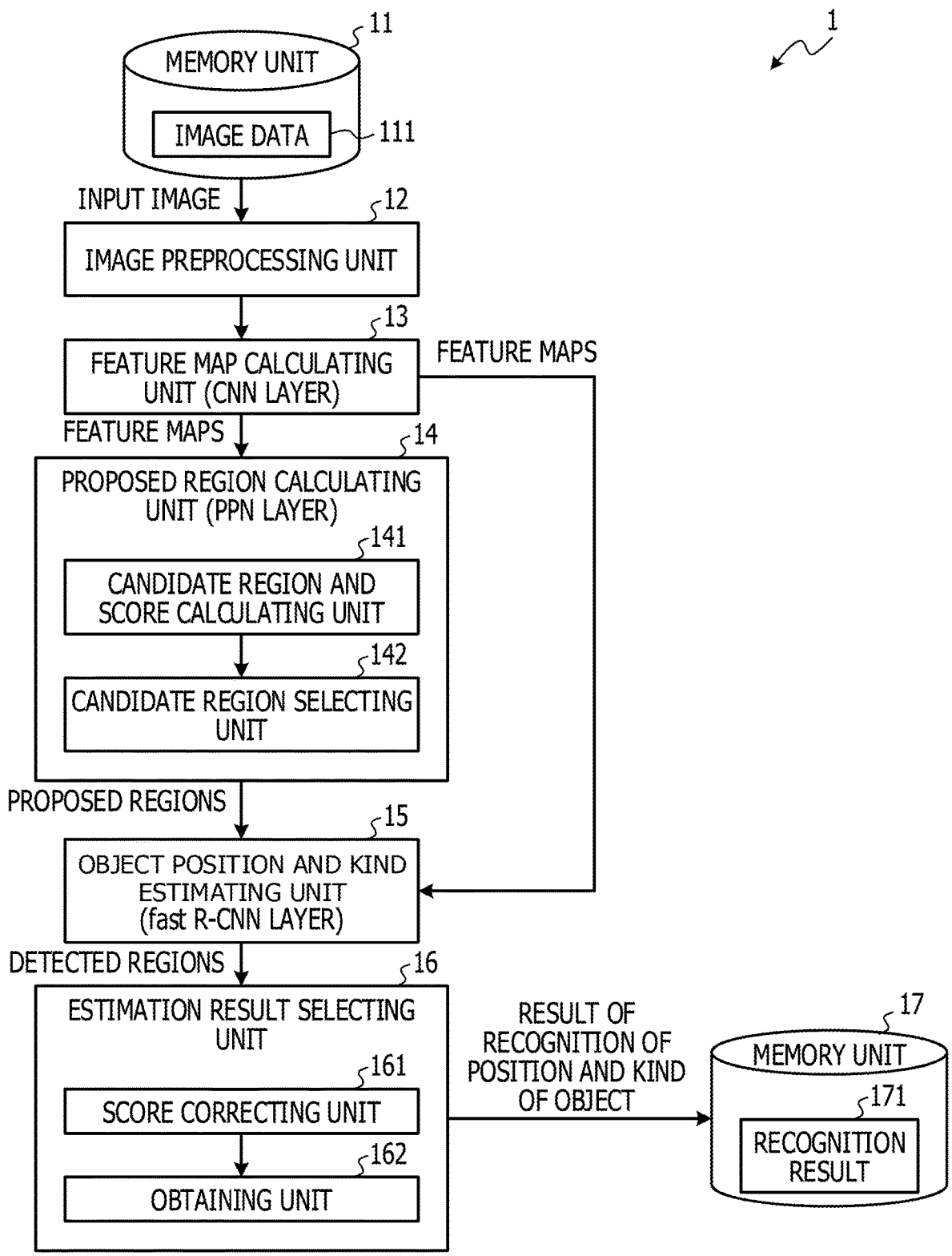
FIG. 1 is a block diagram illustrating an example of a configuration of a detecting device according to one embodiment.

The conventional technology has the following matters to be improved. For example, in a method of tracking the movement of an object based on the detected position of the object identified in each still image, it may be difficult to estimate a candidate position of the object of interest correctly, and therefore the detection of the object may not be performed correctly. Cited as a case where it is difficult to estimate the candidate position of the object of interest correctly is, as an example, a case where the object of interest is hidden by another object in a certain still image or the like. In addition, cited as another example is a case where the score of the estimated object is estimated to be low due to positional relation between the candidate position of the estimated object and a reference region as a reference for calculating the score or the like.

In one aspect, it is an object of the present technology to improve the accuracy of detection of the position of an object in the processing of detecting the position of the object using a neural network.

An embodiment of the present technology will hereinafter be described with reference to the drawings. However, the embodiment to be described in the following is illustrative only, and is not intended to exclude the application of various modifications and technologies not explicitly illustrated in the following. For example, the present embodiment may be modified and carried out in various manners without departing from the spirit of the present technology. Incidentally, parts identified by the same reference numerals in the drawings to be used in the following description represent identical or similar parts unless otherwise specified.

[1] One Embodiment

[1-1] Example of Configuration

A detecting device 1 according to one embodiment (see FIG. 1) estimates which object is present at which position in an image or an image series, for example, by using a neural network (which hereinafter may be described as an "NN"). The detecting device 1 may be illustratively implemented by a computer system including one or more computers. Incidentally, various kinds of information processing devices such as a server and a personal computer (PC) are cited as computers.

As illustrated in FIG. 1, the detecting device 1 according to one embodiment may illustratively include memory units 11 and 17, an image preprocessing unit 12, a feature map calculating unit 13, a proposed region calculating unit 14, an object position and kind estimating unit 15, and an estimation result selecting unit 16.

Here, the detecting device 1 according to one embodiment enables, by a method to be described later, recognition and tracking of a moving object moving within an image of an image series, for example, a plurality of images (which may be referred to as "frames") arranged in a time series of moving images. Suppose in the following description that the image preprocessing unit 12, the feature map calculating unit 13, the proposed region calculating unit 14, the object position and kind estimating unit 15, and the estimation result selecting unit 16 perform processing for each frame of the image series.

The memory units 11 and 17 store various kinds of data. For example, the memory unit 11 may store image data 111 (for example, data of an image series) as an example of data input to the detecting device 1, and the memory unit 17 may store a recognition result 171 as an example of data output from the detecting device 1. The memory units 11 and 17 may be implemented by at least a part of a storage area of hardware such as a memory or a storage device provided to a computer operating as the detecting device 1. Incidentally, the memory units 11 and 17 may be integrated and managed as one memory unit.

The image preprocessing unit 12 obtains an input image on an image-by-image (frame-by-frame) basis from the image data 111 of the memory unit 11, and performs preprocessing on the input image. The preprocessing may include a size change, a pixel value change, a luminance correction, and the like for changing the input image into an image suitable for processing in subsequent stages.

In the size change, resizing processing may be performed which, for example, changes the length of a short side of the image to 600 pixels as the size of the image input to the feature map calculating unit 13 to be described later and changes the length of a long side of the image to 1000 pixels or less as the size of the image input to the feature map calculating unit 13. In the pixel value change, changing processing may be performed which converts the value of each pixel into a 32-bit floating-point value, for example. In the luminance correction, processing may be performed which subtracts given values (illustratively 122.77, 115.95, and 102.98) from an average luminance of RGB (Red Green Blue) values of the input image, for example.

It is to be noted that the processing of the image preprocessing unit 12 is not limited to the processing described above, and may be modified and performed in various manners according to specifications of a convolutional neural network layer (CNN layer) in the feature map calculating unit 13 and the like. The input image resulting from the preprocessing of the image preprocessing unit 12 is input to the feature map calculating unit 13.

The feature map calculating unit 13 inputs the input image to a CNN layer 130 (see FIG. 2), and outputs feature maps as an example of image feature quantities representing features of the input image.

The CNN layer 130 is an example of an NN including a plurality of processing layers. Visual geometry group (VGG) 16 and the like are cited as non-restrictive examples of the CNN layer 130.

Figure 2:
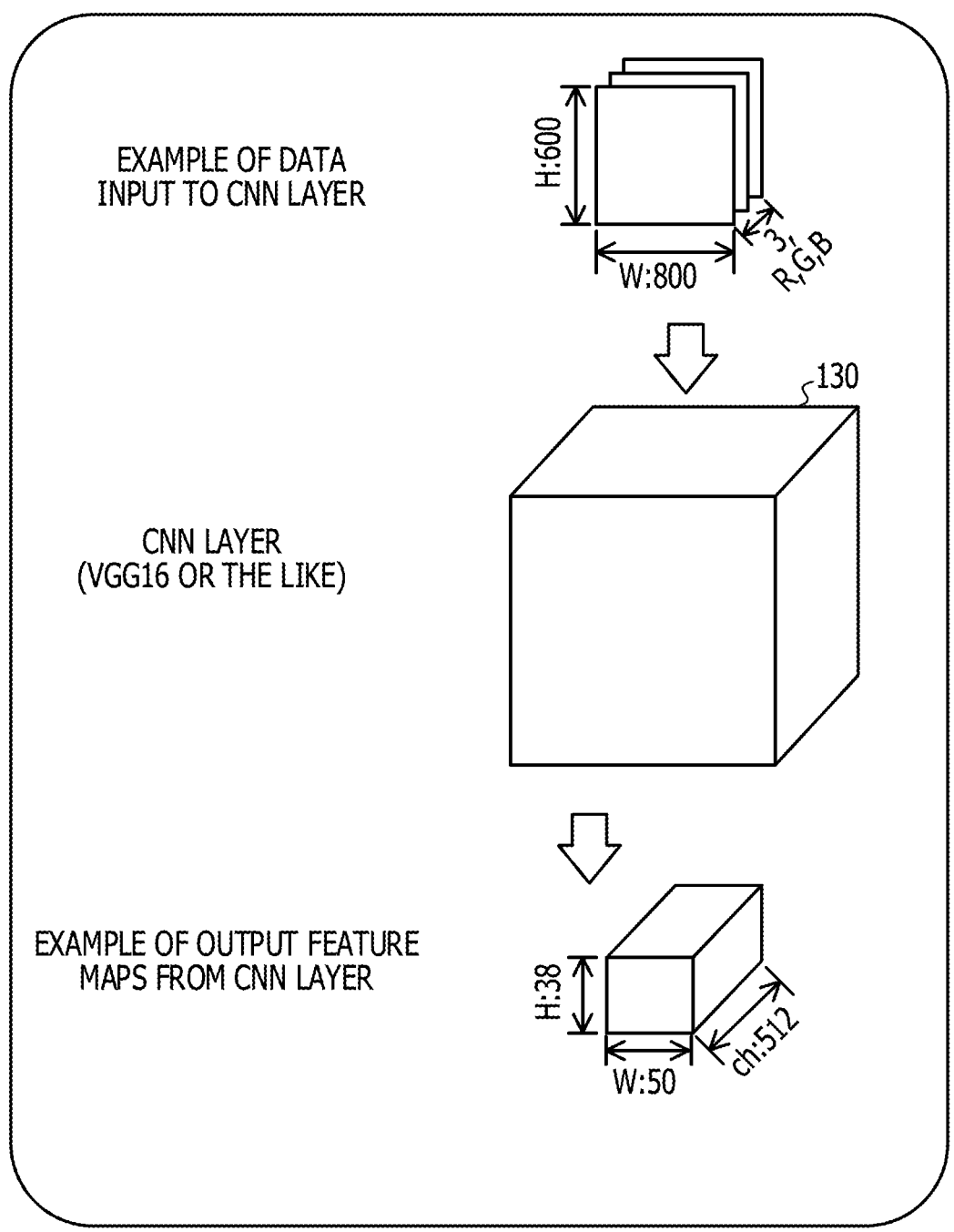
FIG. 2 is a diagram illustrating an example of data input to a feature map calculating unit and output data.

As illustrated in FIG. 2, the CNN layer 130 analyzes the input image (which may be described as "input data") by learning of the NN based on the input image, and extracts and outputs the feature maps of the input image. The feature maps output from the CNN layer 130 are input to each of the proposed region calculating unit 14 and the object position and kind estimating unit 15. Incidentally, the input image may be input from the feature map calculating unit 13 to one or both of the proposed region calculating unit 14 and the object position and kind estimating unit 15 together with the feature maps.

Suppose in the example of FIG. 2 that RGB (three-channel) image data of 600 pixels in height and 800 pixels in width, the image data resulting from the preprocessing in the image preprocessing unit 12, is input as input data to the CNN layer 130.

In response to the above-described input data, the CNN layer 130, for example, outputs feature maps of 38 pixels in height, 50 pixels in width, and 512 channels. The feature maps may include information indicating one feature per channel.

Incidentally, the CNN layer 130 illustrated in FIG. 2 assumes the relu5_3 layer of VGG16. In this case, the CNN layer 130 includes four pooling layers that reduce the size of one side of the feature maps to ½. The height and width of the feature maps are therefore 1/16 of the height and width of the input image.

Incidentally, the CNN layer 130 may be implemented by various known methods, and therefore description of details of processing within the CNN layer 130, a learning method thereof, and the like will be omitted.

As described above, the feature map calculating unit 13 obtains the feature quantities of the input image based on the input image sequentially input from the image series.

The proposed region calculating unit 14 inputs the feature maps obtained from the CNN layer 130 to an region proposal network (RPN) layer 140 (see FIG. 3), and outputs proposed regions as an example of candidate positions in which objects are present.

Figure 3:
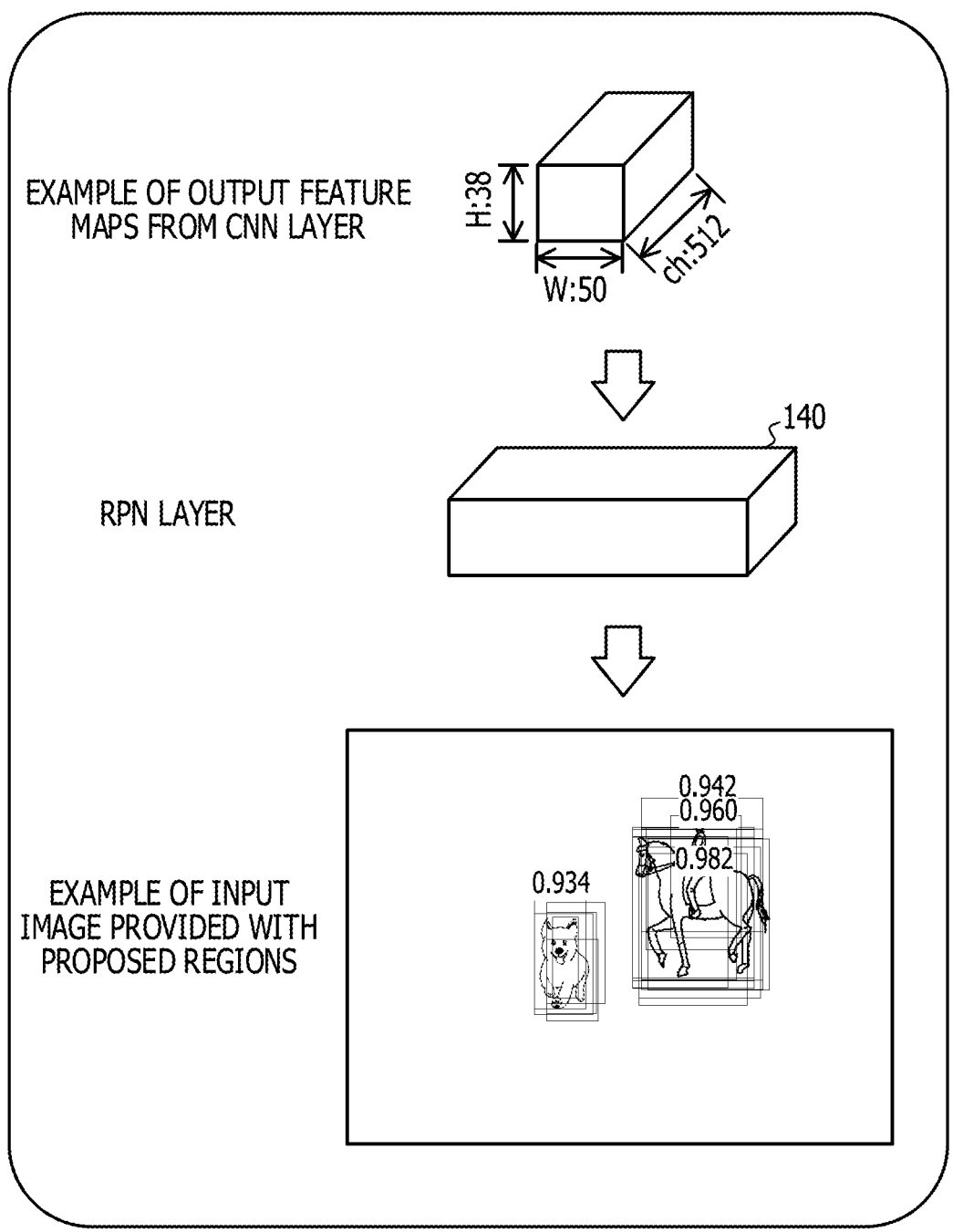
FIG. 3 is a diagram illustrating an example of data input to a proposed region calculating unit and output data.

The RPN layer 140 is an example of an NN including a plurality of processing layers. As illustrated in FIG. 3, the RPN layer 140 analyzes the feature maps based on the feature maps, and calculates and outputs the proposed regions of the feature maps. The proposed regions are an example of candidate regions in which objects are likely to be present. The proposed regions output from the RPN layer 140 are input to the object position and kind estimating unit 15. Incidentally, the input image may be input from the proposed region calculating unit 14 to the object position and kind estimating unit 15 together with the proposed regions.

Suppose in the example of FIG. 3 that the feature maps of 38 pixels in height, 50 pixels in width, and 512 channels, the feature maps being extracted in the feature map calculating unit 13, are input as input data to the RPN layer 140.

The RPN layer 140 may, for example, output the input image provided with the proposed regions in response to the above-described input data. Incidentally, the data output from the RPN layer 140 may be limited to information of the proposed regions which information does not include the input image.

In addition, in the example of FIG. 3, rectangular regions are used as the proposed regions. However, the proposed regions are not limited thereto, and various shapes such as an ellipse may be used as the proposed regions.

The proposed regions may include "scores" indicating likelihood of objects being present in the regions. In the example illustrated in FIG. 3, a score is expressed as a numerical value to three decimal places (the larger the numerical value, the higher the likelihood) with "1.000" as a maximum value. The number of proposed regions output from the RPN layer 140 may be limited to proposed regions whose scores have given numerical values (for example, numerical values equal to or more than "0.800"). Incidentally, in FIG. 3, for ease of viewing of the figure, scores are added to only a part of all of the proposed regions. In addition, the number of proposed regions output from the RPN layer 140 may be limited to a given number (for example, 150).

As illustrated in FIG. 1, the proposed region calculating unit 14 may illustratively include a candidate region and score calculating unit 141 and a candidate region selecting unit 142.

The candidate region and score calculating unit 141 calculates the proposed regions including the above-described scores.

The candidate region selecting unit 142 narrows down the number of proposed regions calculated by the candidate region and score calculating unit 141 to a given number, for example. As an example, the candidate region selecting unit 142 may perform non-maximum suppression (NMS) processing that selects regions with small overlaps in decreasing order of the scores.

Here, the proposed region calculating unit 14 (the candidate region and score calculating unit 141 and the candidate region selecting unit 142) estimates the proposed regions using reference regions, which are referred to as "anchors" and are fixedly arranged in the input image. For example, the proposed region calculating unit 14 may estimate, based on the feature maps, the presence or absence of objects in the regions of the respective anchors or regions formed by combinations of a plurality of anchors, the sizes of regions in which the objects are present, and the above-described scores.

Figure 4:
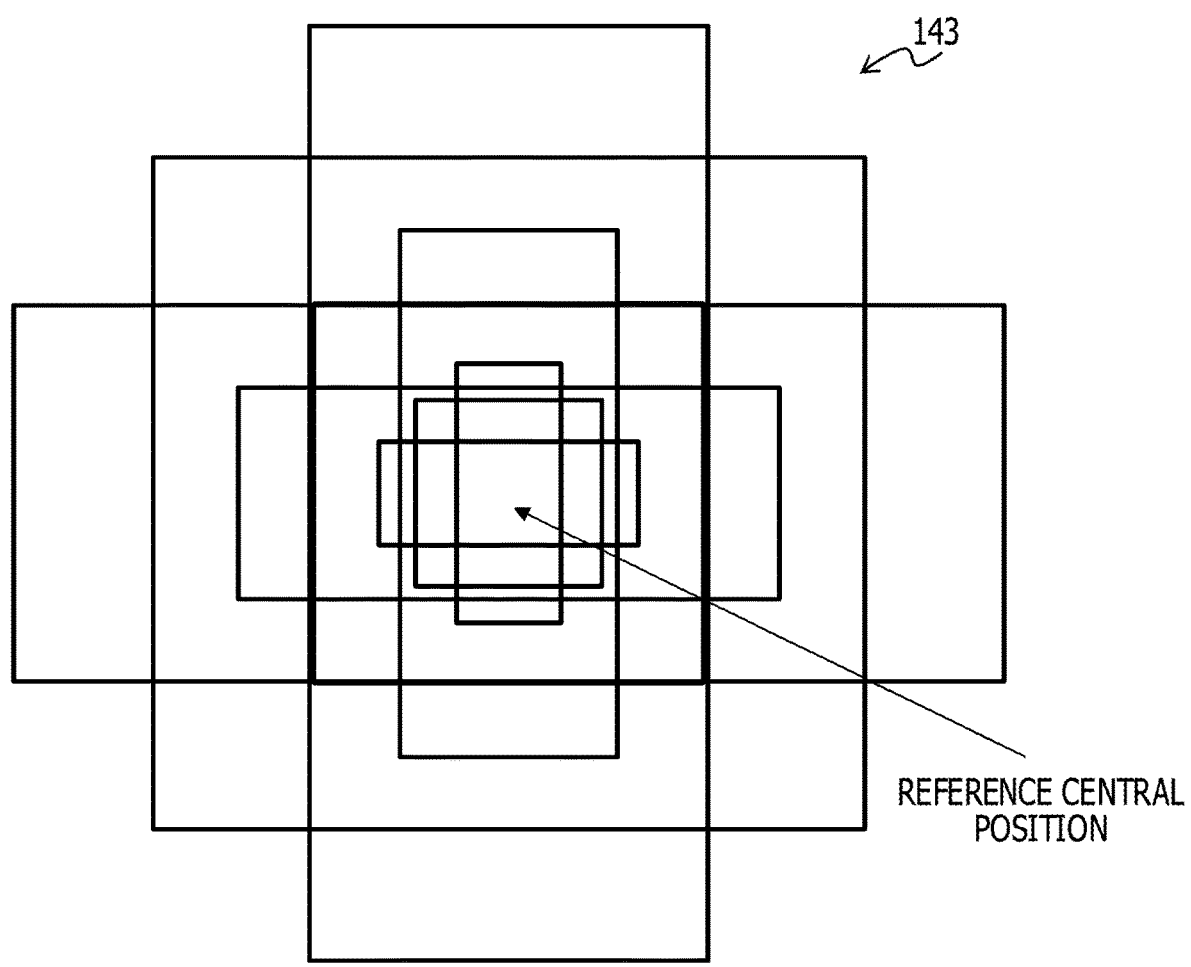
FIG. 4 is a diagram illustrating an example of one anchor group.
Figure 5:
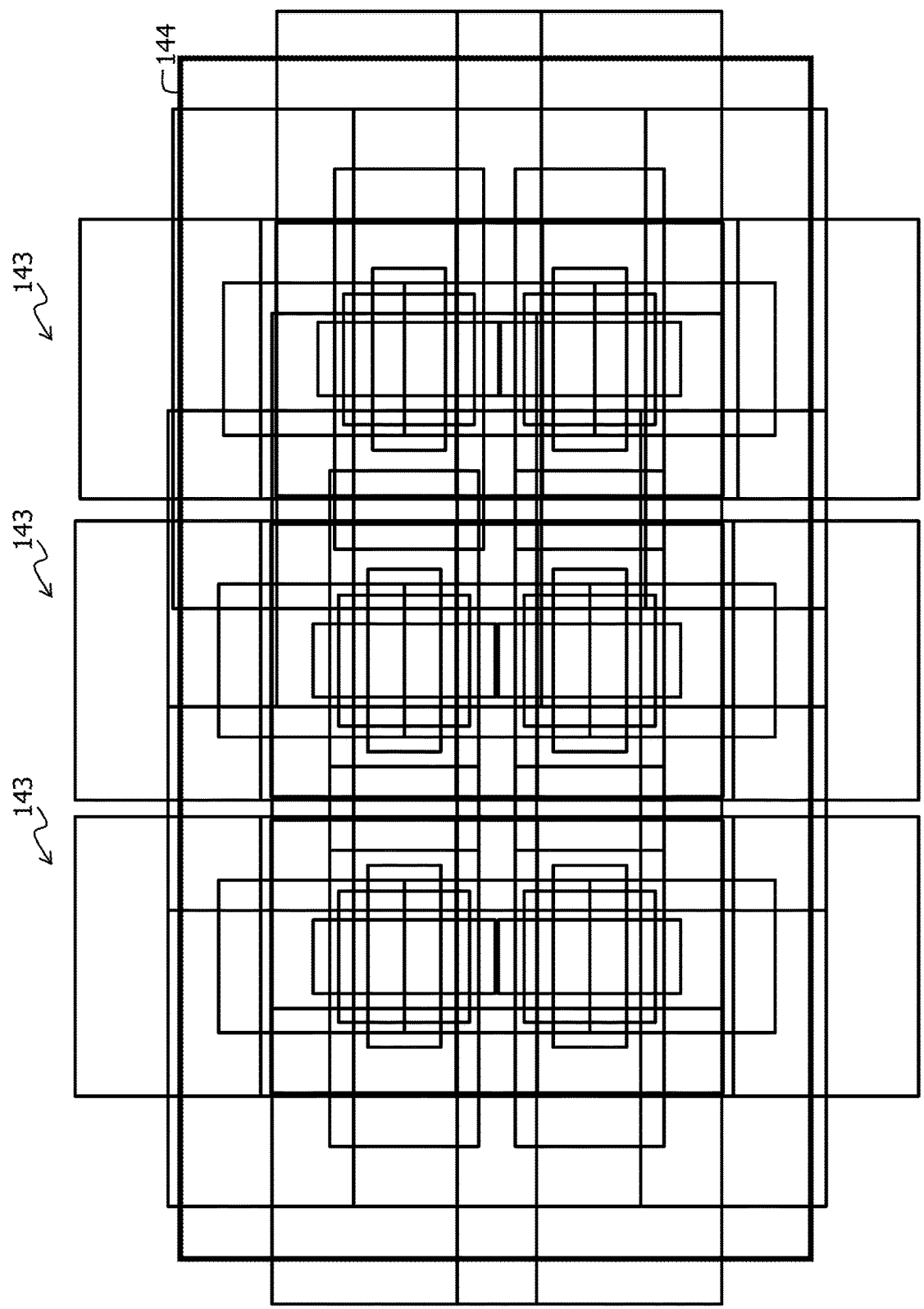
FIG. 5 is a diagram illustrating an example of a plurality of anchor groups arranged in an image.

As illustrated in FIG. 4, one anchor group 143 may be illustratively formed by K=9 anchors having a common central position (reference central position). In one embodiment, as illustrated in FIG. 5, the anchor group 143 is arranged at certain intervals (for example, 16 pixels as a default value) over an entire image 144. For example, in a case of an image 144 of height: 600×width: 800 [pixels], nine anchors are arranged at each of positions indicated by H (number of divisions in a height direction; for example, 38)×W (number of divisions in a width direction; for example, 50) as reference central positions in the image 144. The proposed region calculating unit 14 may thus use H×W×K anchors. Incidentally, in the example of FIG. 5, an example of anchors where H is 2, W is 3, and K is 9 is illustrated for simplification of the figure.

Incidentally, while rectangular regions are used as the anchors in the example of FIG. 4 and FIG. 5, the anchors are not limited thereto, and various shapes such as an ellipse may be used as the anchors.

The RPN layer 140, the NMS processing, and a method of estimating the proposed regions using the anchors may be implemented by various known methods. Description of details thereof will therefore be omitted.

Figure 6:
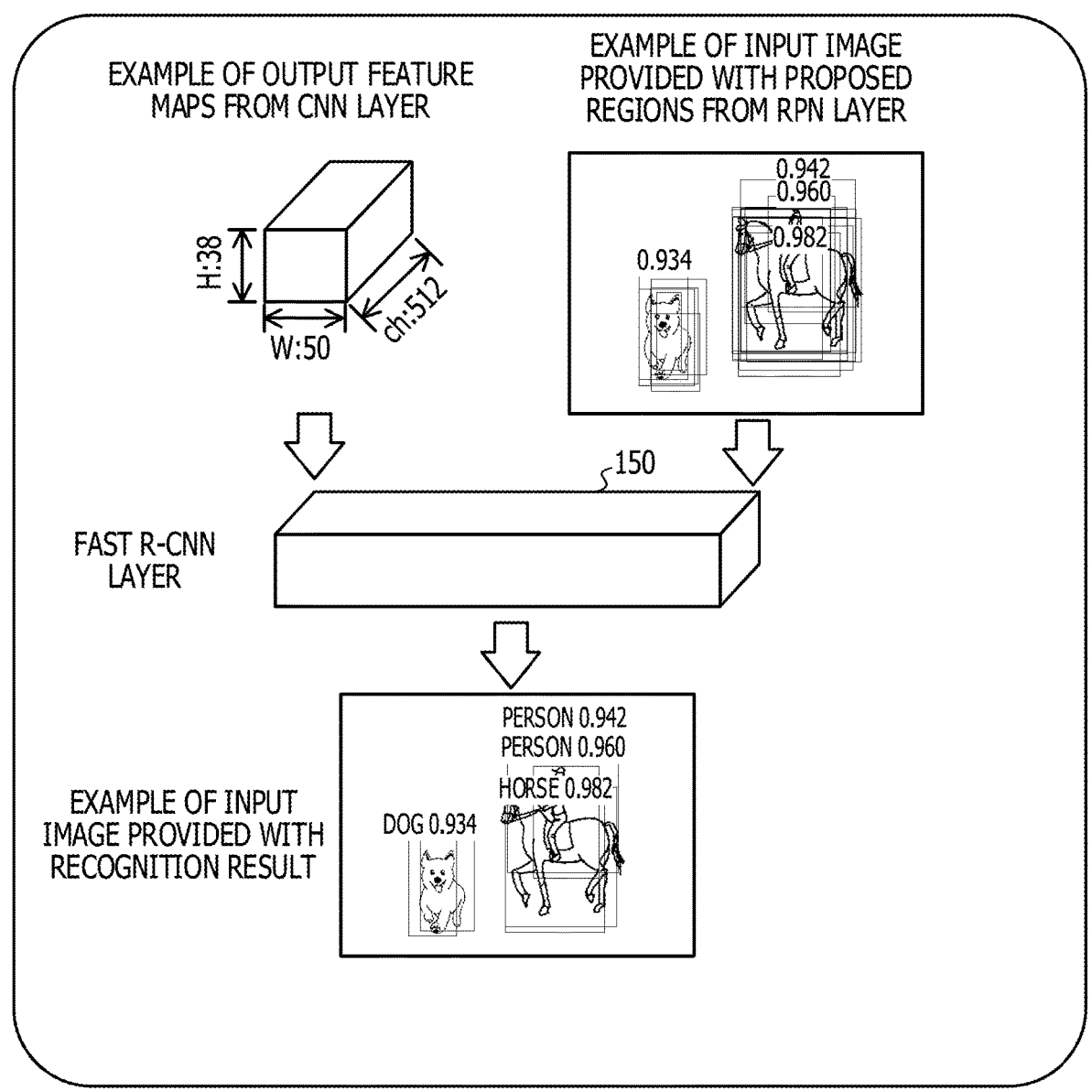
FIG. 6 is a diagram illustrating an example of data input to an object position and kind estimating unit and output data.

The object position and kind estimating unit 15 inputs the feature maps obtained from the CNN layer 130 and the proposed regions obtained from the RPN layer 140 to a Fast R-CNN layer 150 (see FIG. 6). Then, the object position and kind estimating unit 15 analyzes the proposed regions more accurately based on the input information, and estimates kinds of the objects.

The Fast R-CNN layer 150 is an example of an NN including a plurality of processing layers. As illustrated in FIG. 6, the Fast R-CNN layer 150 outputs an estimation result indicating, together with scores, what kinds of objects are present in which rectangular regions in an image region based on the feature maps and the proposed regions. The estimation result may be referred to also as detected regions. Incidentally, the kinds of the objects may be determined by making the NN learn. The estimation result output from the Fast R-CNN layer 150 is input to the estimation result selecting unit 16. Incidentally, the proposed regions from the RPN layer 140 may be input from the object position and kind estimating unit 15 to the estimation result selecting unit 16 together with the estimation result.

Suppose in the example of FIG. 6 that the feature maps of 38 pixels in height, 50 pixels in width, and 512 channels, the feature maps being extracted in the feature map calculating unit 13, are input as input data to the Fast R-CNN layer 150. In addition, suppose that the input image provided with the proposed regions including the scores, the proposed regions being calculated in the proposed region calculating unit 14, is input as input data to the Fast R-CNN layer 150.

The Fast R-CNN layer 150 may, for example, output the input image provided with the estimation result in response to the above-described input data. Incidentally, the data output from the Fast R-CNN layer 150 may be limited to information of the estimation result which information does not include the input image.

In the example of FIG. 6, the input image provided with the estimation result illustrates proposed regions narrowed down from the proposed regions from the RPN layer 140 according to the scores and positional relation to the anchors. In addition, the input image provided with the estimation result illustrates the estimated kinds (for example, "Person," "Horse," and "Dog") of the objects in the proposed regions together with the scores.

Incidentally, the Fast R-CNN layer 150 may be implemented by various known methods, and therefore description of details thereof will be omitted.

As described above, the feature map calculating unit 13, the proposed region calculating unit 14, and the object position and kind estimating unit 15 are an example of an estimating unit that estimates, for a first image within an image series, a plurality of sets of candidate regions in which presence of objects is estimated within the first image and indexes indicating possibilities of the presence of the objects in the candidate regions according to image feature quantities of the first image.

Figure 7:
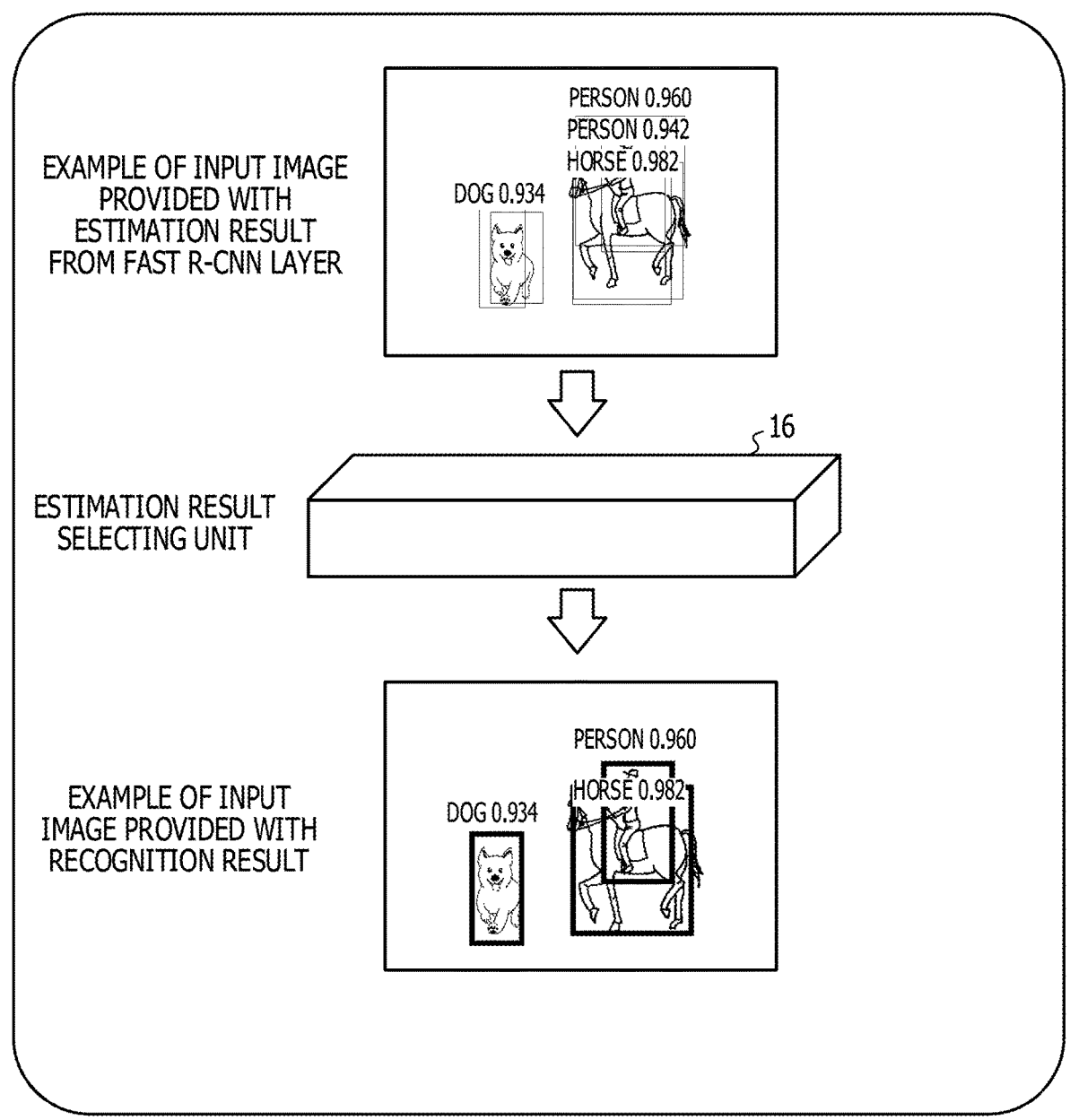
FIG. 7 is a diagram illustrating an example of data input to an estimation result selecting unit and output data.

As illustrated in FIG. 7, based on the input image provided with the estimation result input from the object position and kind estimating unit 15, the estimation result selecting unit 16 obtains a position for each of the kinds of the objects from the estimation result, and outputs the input image provided with a result of recognition of the positions and kinds of the objects as a result of the obtainment. Incidentally, the estimation result selecting unit 16 may use the information of the proposed regions output from the RPN layer 140 in processing of the obtainment. The input image provided with the recognition result output from the estimation result selecting unit 16 is stored and accumulated as a recognition result 171 in the memory unit 17.

Incidentally, the estimation result selecting unit 16 may, for example, output information of the recognition result which information does not include the input image based on the above-described estimation result or the input image provided with the estimation result.

As with the proposed region calculating unit 14, the estimation result selecting unit 16 may perform NMS processing or the like that selects regions with small overlaps in decreasing order of the scores.

As described above, the estimation result selecting unit 16 is an example of a processing unit that determines the positions of the objects in the first image using the candidate regions and the indexes in the estimated plurality of sets.

The feature map calculating unit 13, the proposed region calculating unit 14, the object position and kind estimating unit 15, and the estimation result selecting unit 16 described above function as a Faster R-CNN. The Faster R-CNN may quickly recognize (detect) which kinds of objects among kinds learned by the NN are present in which rectangular regions of the input image, using NN weights learned using training data.

Here, the estimation result selecting unit 16 analyzes the estimation result (or the input image provided with the estimation result) input from the object position and kind estimating unit 15, and improves accuracy of estimation of the positions and kinds of the objects in the Faster R-CNN in a next and subsequent frames based on a result of the analysis. In other words, the estimation result selecting unit 16 analyzes an estimation result in a past frame (or the input image provided with the estimation result), and improves the accuracy of estimation of the positions and kinds of the objects in the Faster R-CNN for a present input image based on a result of the analysis. The estimation result selecting unit 16 may therefore include a storage unit that stores and accumulates estimation results over a few past frames or results of analysis of the estimation results. The storage unit may be implemented by at least a part of a storage area of a memory or a storage device of the detecting device 1.

As an example, the estimation result selecting unit 16 may calculate movement information indicating the movement position of an object in the present frame based on detected regions in the past frames. Then, based on the calculated movement information, the estimation result selecting unit 16 may perform processing of the Faster R-CNN, for example, processing of narrowing down estimation results or processing of calculating a weighted mean of the estimation results, which processing will be described later. Incidentally, the movement information is information about the position of the object in the present frame, the position being predicted from the estimation results in the past frames.

Cited as a first example of the movement information is correction information that increases the scores of detected regions close to (for example, having a large overlap with) a predicted region among the detected regions output from the object position and kind estimating unit 15. The correction information may be, for example, the scores themselves after the correction of the detected regions or may be, for example, coefficients for weighting that makes the scores higher than the scores of the other proposed regions.

Incidentally, the predicted region is a region indicating the position of an object predicted in the present frame, and may be of a data structure similar to that of the detected regions.

In the case of the first example, the movement information may be input to NMS processing or the like that selects regions with small overlaps in decreasing order of the scores in the estimation result selecting unit 16.

Incidentally, the movement information in the first example may, for example, include the predicted region and correction information that increases the score of the predicted region in place of the above-described correction information.

In addition, cited as a second example of the movement information is information for calculating a weighted mean of detected regions close to (for example, having a large overlap with) the predicted region among the detected regions output from the object position and kind estimating unit 15. At least one kind of information in the following, for example, is cited as the information for calculating the weighted mean. In other words, the movement information according to the second example may be said to be weight information of each of a plurality of candidate regions as processing targets of processing of calculating the weighted mean of an input image input next.

distances between the predicted region and the detected regions

Mahalanobis distance (to be described later)

the scores of the detected regions likelihood of tracking

In the case of the second example, the movement information may be input to processing of calculating the weighted mean of the detected regions close to (for example, having a large overlap with) the predicted region in the estimation result selecting unit 16.

Incidentally, also in the second example, when no movement information has occurred, the estimation result selecting unit 16 may obtain an estimation result by the NMS processing in processing of the frame at that time. That is, the estimation result selecting unit 16 may switch between the NMS processing and the processing of calculating the weighted mean of the candidate regions according to the movement information.

As described above, the estimation result selecting unit 16 (the score correcting unit 161 (see FIG. 1)) is an example of an obtaining unit that obtains movement information about the movement of an object from the image series. For example, the estimation result selecting unit 16 may be said to obtain the movement information based on temporal changes in the position of the object recognized as the same object based on the position of the object which position is determined in each of a plurality of past images temporally preceding the first image within the image series. Then, the estimation result selecting unit 16 as an example of a processing unit performs correction processing on the candidate regions and the indexes in the estimated plurality of sets based on the obtained movement information when determining the position of the object in the first image using the candidate regions and the indexes in the estimated plurality of sets.

Thus, the estimation result selecting unit 16 may estimate the predicted region (for example, a rectangular region) of the object moving within the moving image from the image series data in the past, and use the predicted region for processing within the Faster R-CNN. It is thereby possible to improve accuracy of detection of the position of the object in the processing of detecting the position of the object using a neural network.

Here, as described above, the calculation of the Faster R-CNN is targeted for still images. In other words, the Faster R-CNN is a method proposed as an NN for object detection (Object Detection) originally targeted for still images.

Therefore, for example, in the above-described related technology (method of tracking the movement of an object based on the detected position of the object identified in each still image), in a case where a moving person is set as a tracking target, the Faster R-CNN is performed as processing independent of tracking processing. That is, in the object detection (Object Detection) using the Faster R-CNN, a calculation result obtained by the tracking processing is not used within the processing of the Faster R-CNN.

Specifically, the above-described related technology performs, by the Faster R-CNN, processing of repeatedly estimating a "pedestrian" and the position (for example, a rectangular region) of the pedestrian and processing of performing tracking based on an estimation result obtained. However, the processing within the Faster R-CNN is not changed.

On the other hand, the estimation result selecting unit 16 may enhance accuracy of object detection and tracking by utilizing the information of the predicted region that may be estimated from the motion of the object in the processing within the Faster R-CNN, for example, by using a result of the tracking in the processing within the Faster R-CNN. That is, the estimation result selecting unit 16 uses the information of the predicted region to narrow down estimation results of kinds and positions of objects having an overlap or take the weighted mean thereof.

Thus, the information of still images and the information of the predicted region based on tracking of the moving object are qualitatively different from each other, and the accuracy of object detection targeted for moving images may be improved by using the qualitatively different information in the processing within the Faster R-CNN.

In addition, in the NN, much labor is needed to label learning data for object detection. On the other hand, the estimation result selecting unit 16 makes it possible to recognize in the Faster R-CNN that an object moving between frames is the same object. Hence, for example, as a label of learning data, the same label (for example, a kind of the object) may be added to the object having continuity between the frames.

Further, even when the object goes behind an obstacle (for example, a tree) or the like and a part of the object is hidden in a certain frame, for example, the estimation result selecting unit 16 may estimate the predicted region by using the information of the position and kind of the object, the information being estimated from past recognition results. Thus, regions not proposed as proposed regions in still images are proposed as predicted regions using the movement information, so that the moving object may be recognized.

In addition, the recognition accuracy of the Faster R-CNN may be improved by using the information of a predicted region also for an object that has moved far away and is represented only by information of coarse pixels.

Further, in the detecting device 1 described above, the estimation result selecting unit 16 uses the NMS processing from overlapping regions with close scores, and performs processing of excluding regions having large overlaps with already selected regions from selection targets while selecting the regions in order of the scores.

At this time, a plurality of regions having hardly different scores may overlap each other. In this case, a region with a score of 0.995 and a region with a score of 0.99, for example, among proposed regions having very close scores and overlapping each other may only happen to have these scores. For example, there may occur a case where scores opposite from these scores are actually closer to a correct solution. As an example, the scores of respective detected regions output by a neural network that has learned may happen to be such scores depending on a recognized image, a learning image, a network configuration, the magnitude of already learned weights, and the like.

In addition, other than the score information allocated to the regions, candidate regions of an object desired to be detected may happen not to come up as candidates, depending on the arrangement of the anchors (the arrangement of the anchor central positions and the nine anchors prepared in advance).

Even in cases as described above, the estimation result selecting unit 16 may jointly use the information of a predicted region in a latest frame, the information being estimated from the information of past presence regions of the moving object as well as perform the processing of the Faster R-CNN in each frame independently at a still image level. Hence, accuracy of object detection and tracking may be improved.

[1-2] Description of Estimation Result Selecting Unit

Details of the estimation result selecting unit 16 will be described in the following.

As described above, the estimation result selecting unit 16 estimates the predicted region of an object moving within a moving image from image series data in the past, and uses the predicted region for processing within the Faster R-CNN. The estimation result selecting unit 16 thereby improves the accuracy of estimation of the kind and position of the object by the Faster R-CNN.

As illustrated in FIG. 1, the estimation result selecting unit 16 may illustratively include a score correcting unit 161 and an obtaining unit 162.

The score correcting unit 161 estimates the predicted region of an object (which predicted region may also be referred to as a "predicted presence region") in a latest frame based on recognition results in the Faster R-CNN in past frames, and calculates movement information based on the predicted region. For example, as will be described later, the score correcting unit 161 may obtain information for the calculation of a score or a weighted mean together with the estimation of the predicted presence region.

The movement information calculated by the score correcting unit 161 may be provided to the obtaining unit 162 as input to the Faster R-CNN.

The predicted presence region may, for example, be expressed by (x, y, w, h) obtained by combining a predicted presence position (x, y) and a presence region (w, h) of the object. Incidentally, x denotes the position of a representative point (for example, a central point) of a rectangular region in a vertical direction (first direction) within an image, and y denotes the position of the representative point of the rectangular region in a horizontal direction (second direction orthogonal to the first direction) within the image. In addition, w denotes the width (length) of the rectangular region in the vertical direction (first direction), and h denotes the height (length) of the rectangular region in the horizontal direction (second direction).

Figure 8:
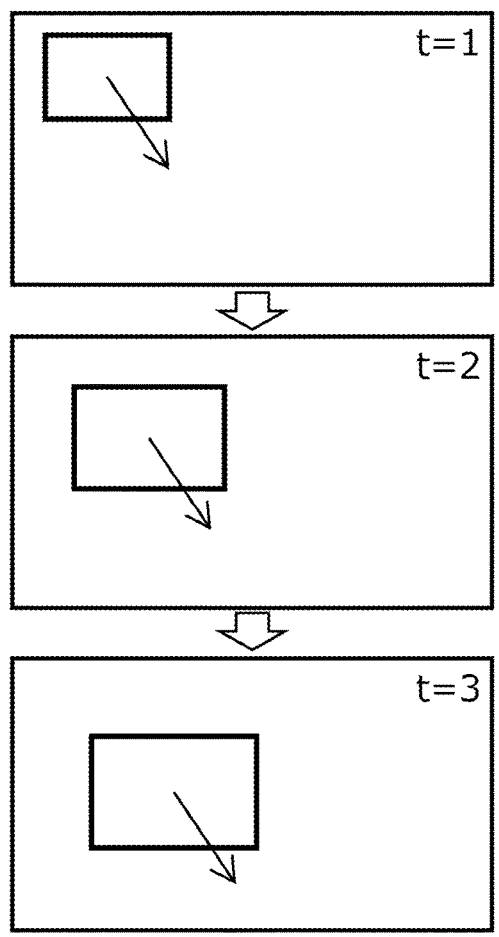
FIG. 8 is a diagram illustrating an example of predicted region estimation processing by an estimation result selecting unit.

As illustrated in FIG. 8, in detecting and tracking the moving object that changes in size, the score correcting unit 161 may estimate the predicted presence region of the object from the image series data in the past using a tracking filter such as a Kalman Filter. The predicted presence region of the object may be estimated by calculating a vector S in each frame and for each target object.

Incidentally, the score correcting unit 161 may also estimate a region parameter other than the rectangular region. In other words, in a case where anchors (of an elliptic shape, for example) other than the rectangular regions are used in the detecting device 1, the score correcting unit 161 may estimate the predicted presence region corresponding to the shape of the anchors. Suppose in the following description that the shape of the anchors is rectangular.

For example, based on the position and size of a rectangular region estimated by the ordinary Faster R-CNN for a first time, a kind (a person, a vehicle, a horse, or the like) of an object, a frame rate at a time of observation, or the like, the score correcting unit 161 may set a rectangular region in which the object may be detected next. Then, the score correcting unit 161 may estimate that the same kind of target object recognized within the set rectangular region is the same object as the object recognized in the previous frame.

Thus, the score correcting unit 161 may identify target objects in each frame, obtain the vector S by applying each of the target objects to a motion model prepared in advance, and estimate the predicted presence region. Various motion models such as a uniform motion model and an acceleration motion model are cited as the motion model.

Incidentally, in place of the motion model, another method of obtaining correlation between pixel values in images or the like may be used for the estimation of the predicted presence region of the object. In addition, a tracking model may be used in which consideration is given to an unobserved state based on data association (Data Association) that associates a tracking object and a detected object with each other, as in multiple hypothesis tracking (MHT) or the like.

Details of the estimation of the predicted presence region of the object by the score correcting unit 161 will be described later.

The score correcting unit 161 may calculate movement information based on the estimated predicted presence region.

The obtaining unit 162 outputs a recognition result 171 based on the movement information calculated by the score correcting unit 161. The processing of outputting the recognition result 171 by the obtaining unit 162 may be performed as follows so as to correspond to the above-described first and second examples of the movement information. Incidentally, in the following examples, the memory units 11 and 17 are not illustrated in FIG. 9 and FIG. 11.

First Example

Figure 9:
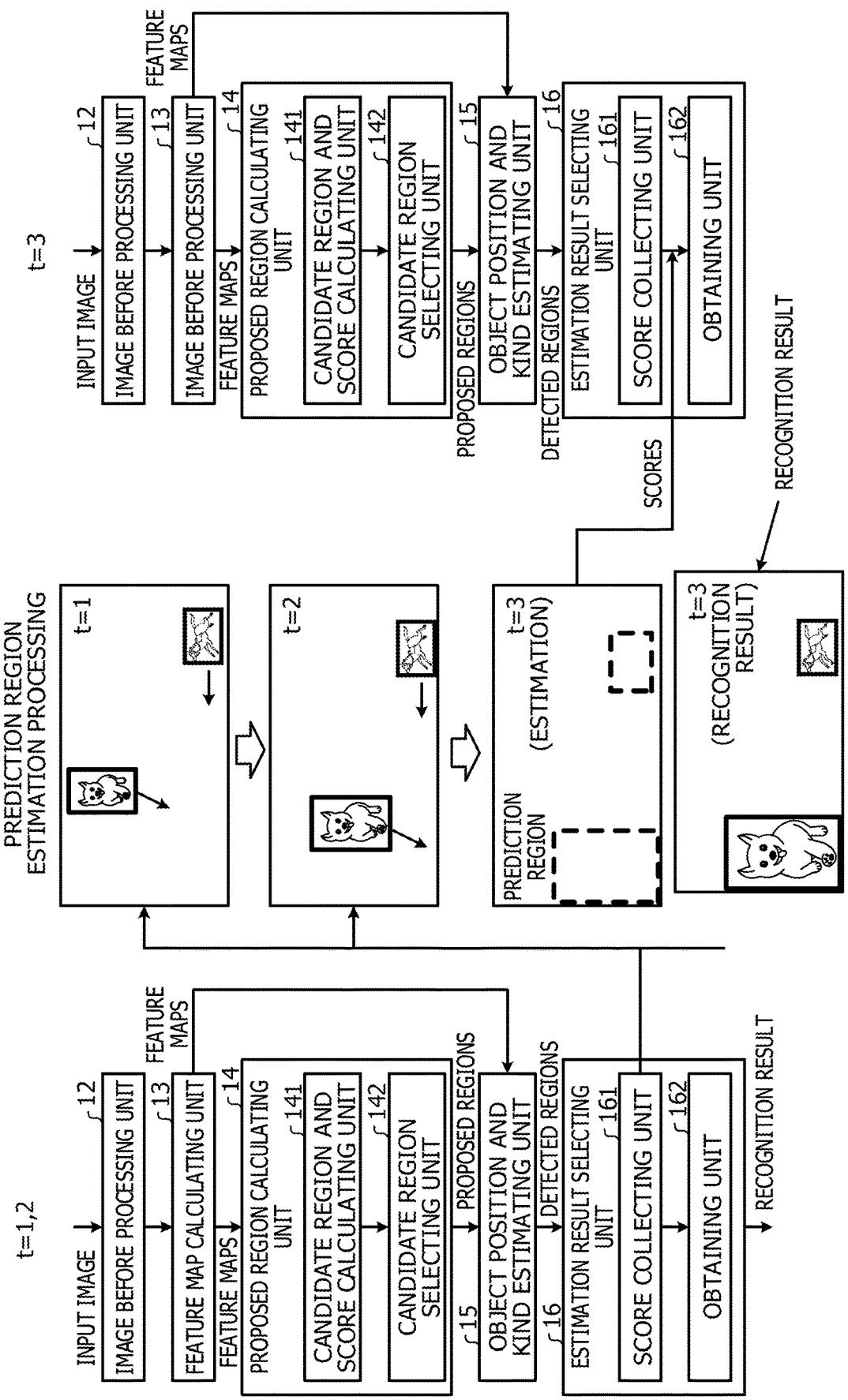
FIG. 9 is a diagram of assistance in explaining a predicted region estimation processing in a first example by an estimation result selecting unit.
Figure 10:
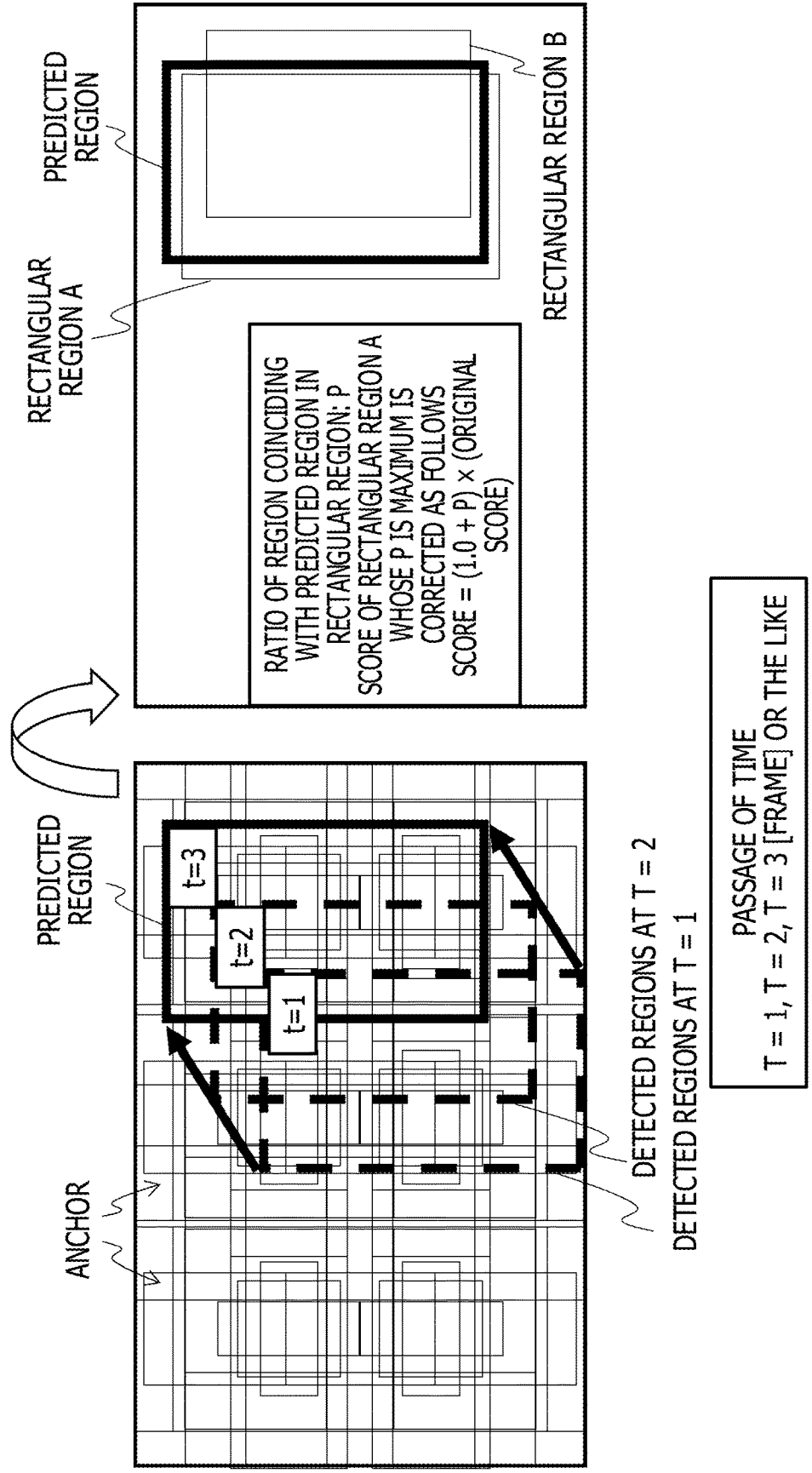
FIG. 10 is a diagram illustrating an example of the predicted region estimation processing illustrated in FIG. 9.

As illustrated in FIG. 9 and FIG. 10, the obtaining unit 162 may use, at time t=3, the information of the predicted presence region at t=3, the information being estimated at time t=2 by the score correcting unit 161, for example, based on the positional information of the moving object or the like at t=1 and t=2. The obtaining unit 162 may, for example, have functions of NMS processing, and perform the NMS processing with correction information as input, the correction information changing the score of a rectangular region before the NMS processing is performed according to a distance of the rectangular region from the predicted presence region. A result of performing the NMS processing may be output as a recognition result 171 (see FIG. 1).

As an example, as illustrated in FIG. 10, the obtaining unit 162 may receive, as input, correction information that increases the scores of rectangular regions (detected regions) close in position and size to the predicted region at t=3. As the detected regions close in position and size to the predicted region, a rectangular region in which a ratio p of a region coinciding with the predicted region is a maximum (rectangular region A in the example of FIG. 10), for example, may be selected among rectangular regions. In this case, the obtaining unit 162 may, for example, correct the score of the rectangular region A by multiplying the score of the rectangular region A in which p is a maximum by (1.0+p). (1.0+p) is an example of the correction information.

As described above, the obtaining unit 162 may be said to perform processing of narrowing down a plurality of sets into a given number of sets based on the respective indexes of the plurality of sets.

Second Example

Figure 11:
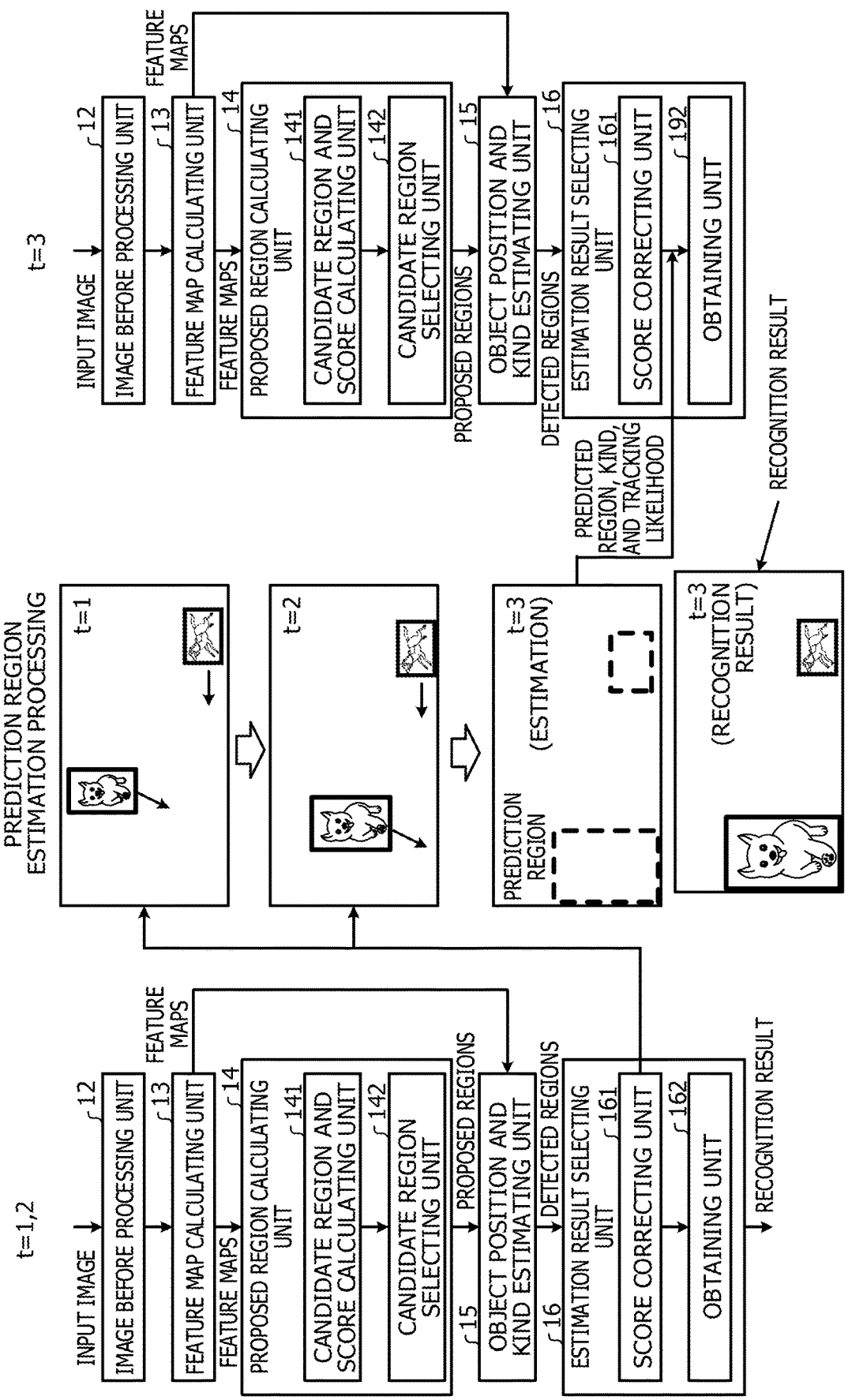
FIG. 11 is a diagram of assistance in explaining a predicted region estimation processing in a second example by an estimation result selecting unit.

In addition, as illustrated in FIG. 11, the obtaining unit 162 may use, at time t=3, the information of the predicted presence region at t=3, the information being estimated by the score correcting unit 161 at time t=2, for example, based on the positional information of the moving object at t=1 and t=2. The obtaining unit 162 may, for example, have a function of calculating a weighted mean of detected regions together with the functions of the NMS processing. The obtaining unit 162 may calculate the weighted mean of the detected regions based on information for calculating the weighted mean, the information being input from the score correcting unit 161. The calculated weighted mean may be output as a recognition result 171 (see FIG. 1).

Incidentally, in a frame at time t=1 or t=2 in the example of FIG. 11, the obtaining unit 162 may output the recognition result 171 by the NMS processing as in the first example.

Thus, the obtaining unit 162 may be said to perform processing of calculating the weighted mean of a plurality of candidate regions of a plurality of sets based on the respective indexes of the plurality of sets.

As described above, the estimation result selecting unit 16 may enhance recognition accuracy of object detection. Incidentally, the recognition result 171 stored into the memory unit 17 by the estimation result selecting unit 16 may be used as labeled learning data in the Faster R-CNN.

As described above, the Faster R-CNN uses the proposed regions with a limited number of anchor positions as references in estimating the position and kind of an object. A method of estimating the proposed regions is a unique method based on an empirical rule. For example, the proposed regions are estimated by arranging anchors having sizes and aspect ratios specified in advance at certain pixel intervals, and adding a correction value calculated using the NN with a still image as input to these anchor reference positions.

Only the information of still images is used for the calculation of the object candidate regions (proposed regions) by the above-described method. On the other hand, the detecting device 1 according to one embodiment may improve the accuracy of object detection by using the movement information based on the object candidate regions (position, height, and width) estimated from the motion of the object, the movement information being information qualitatively different from the information of still images.

Figure 12:
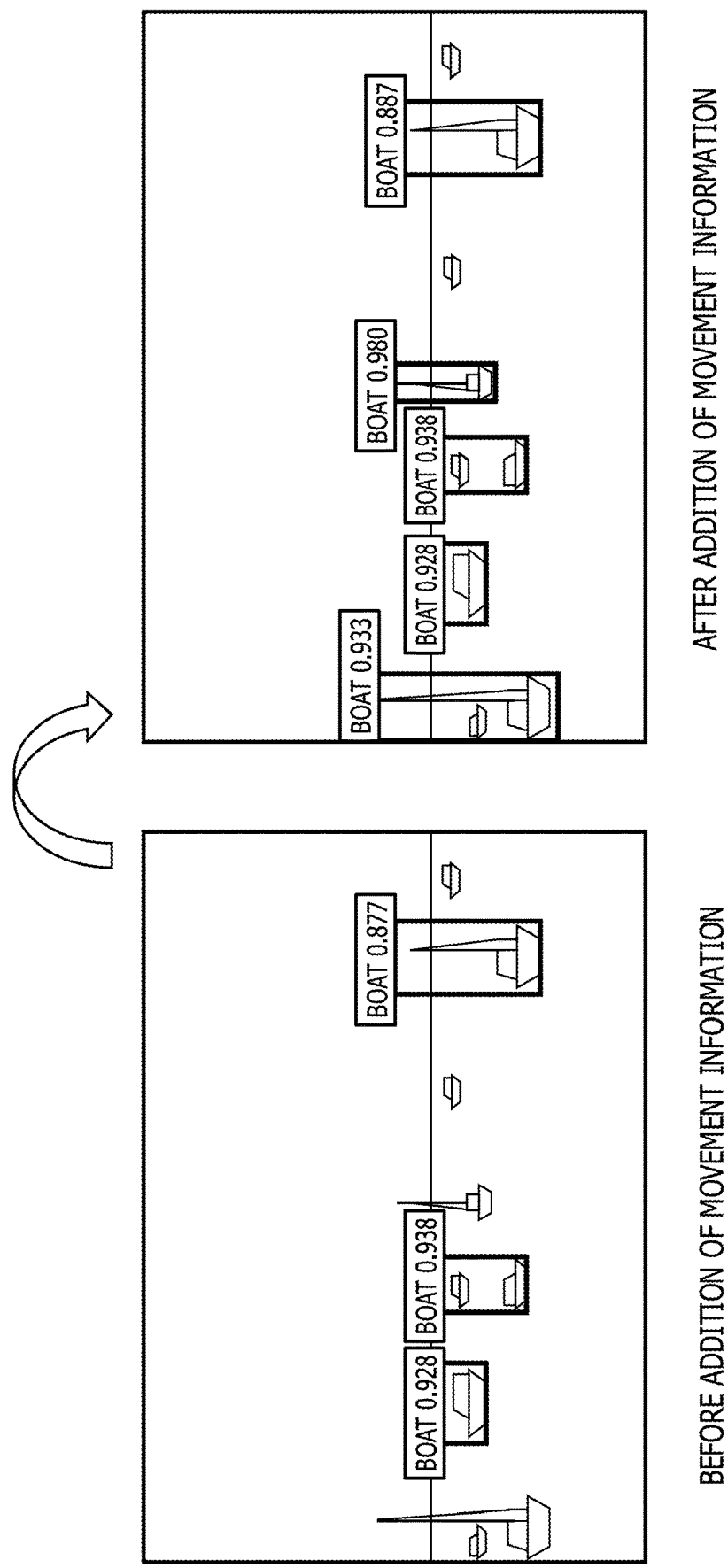
FIG. 12 is a diagram illustrating an example of recognition results before and after addition of movement information to a Faster R-CNN.

FIG. 12 is a diagram illustrating an example of recognition results before and after movement information is added to the Faster R-CNN in an image in which approximately 6 to 10 ships (boats) are floating on the sea. Incidentally, FIG. 12 illustrates an example in which the detected regions output from the object position and kind estimating unit 15 are evaluated based on score correction information (for example, correction information that increases the scores of rectangular regions in which boats are likely to be actually present) as an example of the movement information.

Consequently, boats are newly detected with high scores in regions in which appropriate score correction is made (see the right side of FIG. 12). A similar effect to that of the example illustrated in FIG. 12 may be expected to be obtained also in the case where the information for calculating the weighted mean as an example of the movement information is provided to the Faster R-CNN

[1-3] Example of Operation

Description will next be made of an example of operation of the detecting device 1 configured as described above.

First Example

Figure 13:
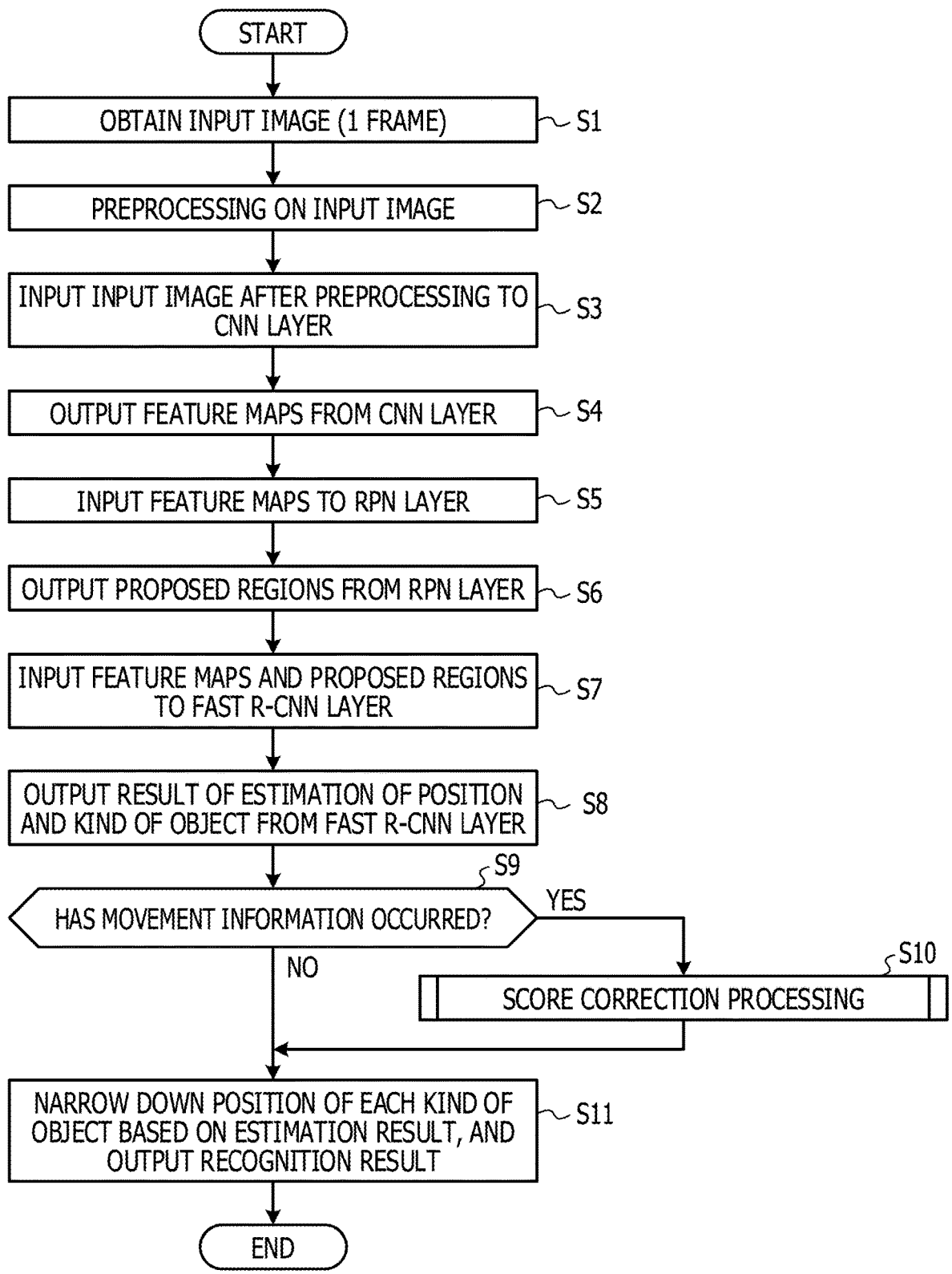
FIG. 13 is a diagram illustrating an example of an operation flow of a detecting device according to a first example.

In the first example, as illustrated in FIG. 13, the detecting device 1 obtains one input image (for example, one frame) from the image data 111 (for example, image series data) stored in the memory unit 11 (step S1).

The image preprocessing unit 12 performs preprocessing on the input image (step S2). The preprocessing may include a size change for changing the input image into an image suitable for processing in subsequent stages, a pixel value change, a luminance correction, and the like.

The image preprocessing unit 12 inputs the input image after the preprocessing to the feature map calculating unit 13 (step S3). In the feature map calculating unit 13, feature maps are output from the CNN layer 130 (step S4).

The feature map calculating unit 13 inputs the feature maps to the proposed region calculating unit 14 (step S5). In the proposed region calculating unit 14, proposed regions are output from the RPN layer 140 (step S6).

Next, the feature maps from the feature map calculating unit 13 and the proposed regions from the proposed region calculating unit 14 are input to the object position and kind estimating unit 15 (step S7). The processing then proceeds to step S8.

In step S8, in the object position and kind estimating unit 15, a result of estimation of the position and kind of an object (detected regions) is output from the Fast R-CNN layer 150.

The estimation result selecting unit 16 determines whether or not movement information has occurred (step S9). When no movement information has occurred (No in step S9), the processing proceeds to step S11. Incidentally, cited as a case where no movement information has occurred is illustratively a case where there is no past input image (for example, the case of t=1 or t=2 illustrated in FIG. 9). Alternatively, also cited as a case where no movement information has occurred is a case where no predicted region is recognized (for example, there is no object in the past input images) or the like.

When movement information has occurred (Yes in step S9), score correction processing is performed (step S10). The processing then proceeds to step S11.

In step S11, the obtaining unit 162 of the estimation result selecting unit 16 narrows down the position of each kind of object based on the estimation result from the object position and kind estimating unit 15, and outputs a result of recognition of the position and kind of the object as a result of narrowing down. At this time, when a score is corrected in step S10, the position of each kind of object is narrowed down based on the score after the correction.

The processing for one input image (for example, one frame) input in step S1 is thereby ended.

Figure 14:
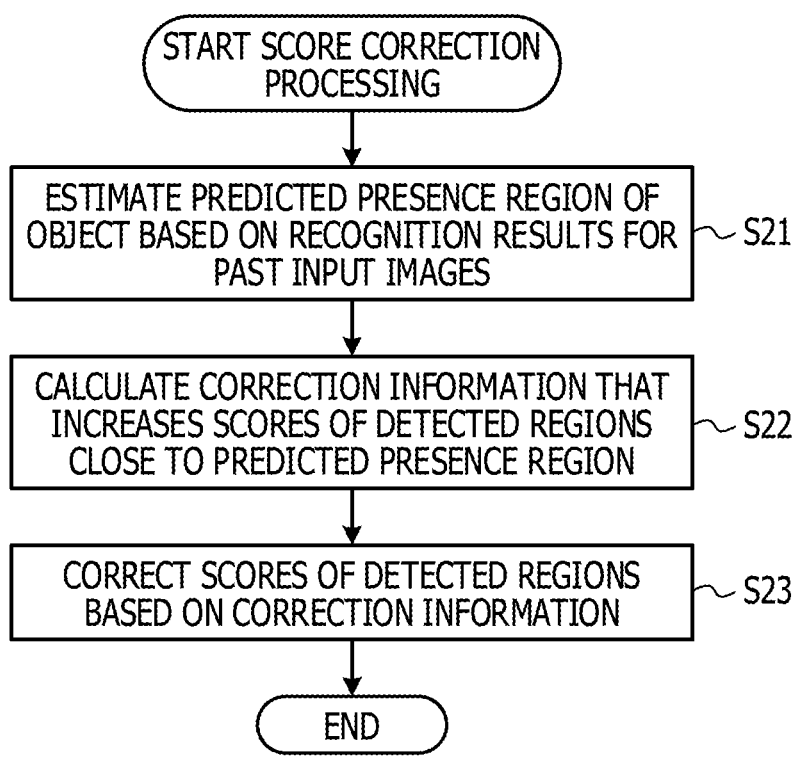
FIG. 14 is a diagram illustrating an example of an operation flow of recognition result analysis processing illustrated in FIG. 13.

In the score correction processing of step S10, as illustrated in FIG. 14, the score correcting unit 161 of the estimation result selecting unit 16 estimates a predicted presence region of the object based on recognition results for past input images (step S21).

Next, the score correcting unit 161 calculates correction information that increases the scores of detected regions close to the estimated predicted presence region (step S22). Incidentally, the correction information may be information that increases the scores of proposed regions close to (for example, having a large overlap with) the predicted region. The correction information may be, for example, the scores themselves after correction of the proposed regions, or may be, for example, coefficients for weighting that makes the scores higher than the scores of other proposed regions.

Then, the score correcting unit 161 corrects the scores of the detected regions based on the correction information (step S23). The processing is then ended.

Incidentally, details of processing of estimating the predicted presence region of the object in step S21 will be described later.

Second Example

Figure 15:
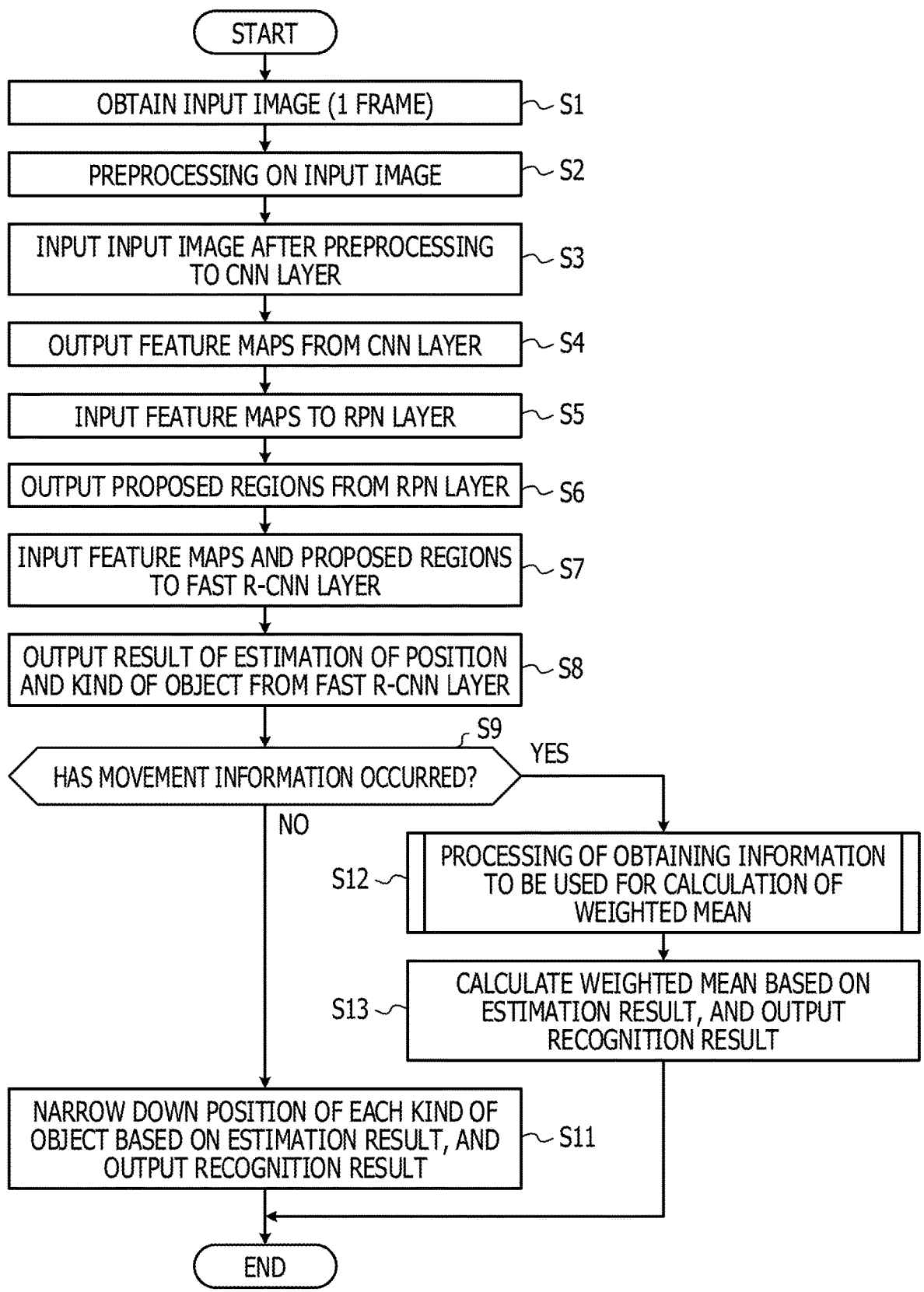
FIG. 15 is a diagram illustrating an example of an operation flow of a detecting device according to a second example.

In the second example, as illustrated in FIG. 15, the processing of steps S1 to S9 is similar to that of the first example illustrated in FIG. 13.

The processing branches according to occurrence or non-occurrence of movement information when the object position and kind estimating unit 15 inputs the estimation result to the estimation result selecting unit 16 in step S8 (step S9).

When no movement information has occurred (No in step S9), the processing proceeds to step S11. Incidentally, cited as a case where no movement information has occurred is illustratively a case where there is no past input image (for example, the case of t=1 or t=2 illustrated in FIG. 9). Alternatively, also cited as a case where no movement information has occurred is a case where no predicted region is recognized (for example, a case where there is no object in the past input images) or the like.

In step S11, the obtaining unit 162 of the estimation result selecting unit 16 narrows down the position of each kind of object based on the estimation result from the object position and kind estimating unit 15, and outputs a result of recognition of the position and kind of the object as a result of narrowing down.

The processing for one input image (for example, one frame) input in step S1 is thereby ended.

When movement information has occurred (Yes in step S9), on the other hand, the estimation result selecting unit 16 performs processing of obtaining information to be used for the calculation of a weighted mean (step S12). The processing then proceeds to step S13.

In step S13, the obtaining unit 162 of the estimation result selecting unit 16 calculates the weighted mean based on the estimation result from the object position and kind estimating unit 15, and outputs a recognition result.

The processing for one input image (for example, one frame) input in step S1 is thereby ended.

Figure 16:
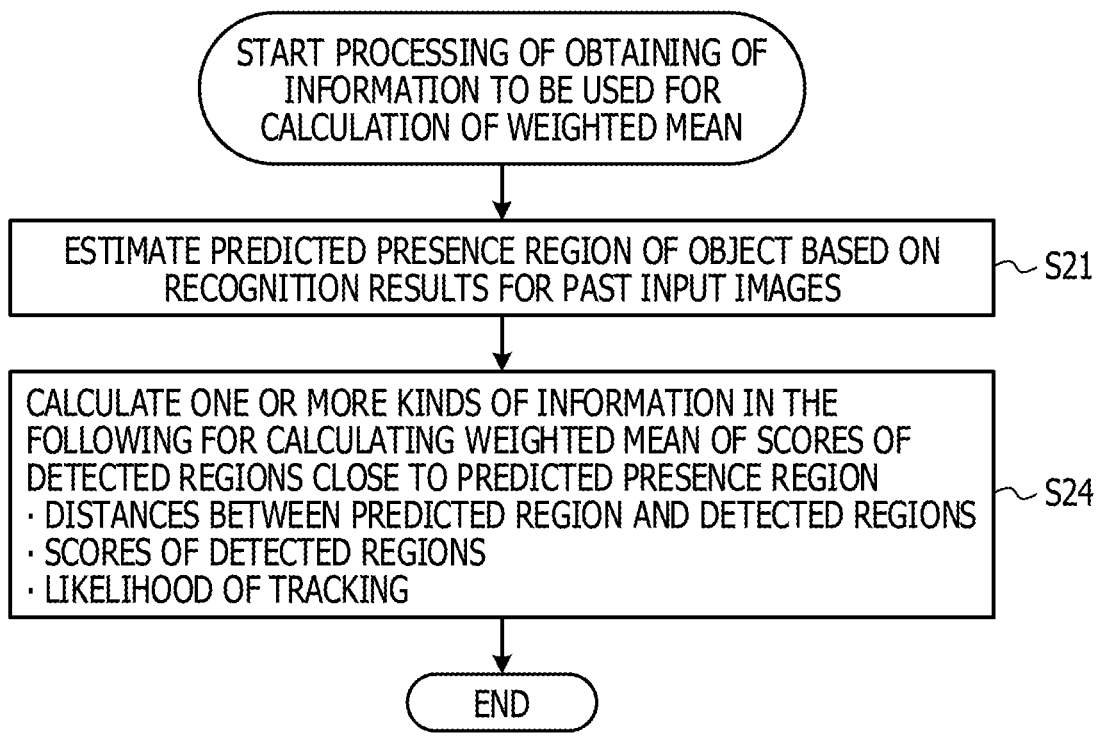
FIG. 16 is a diagram illustrating an example of an operation flow of recognition result analysis processing illustrated in FIG. 15.

In the processing of obtaining the information to be used for the calculation of the weighted mean, as illustrated in FIG. 16, the score correcting unit 161 of the estimation result selecting unit 16 estimates a predicted presence region of the object based on recognition results for past input images (step S21).

Then, the score correcting unit 161 of the estimation result selecting unit 16 outputs movement information based on the estimated predicted presence region to the obtaining unit 162 (step S24). The processing is then ended. The score correcting unit 161 may, for example, calculate, as the movement information, one or more kinds of information in the following for calculating the weighted mean of the scores of detected regions close to the estimated predicted presence region.

distances between the predicted region and the detected regions

Mahalanobis distance (to be described later)

the scores of the detected regions likelihood of tracking

Incidentally, details of processing of estimating the predicted presence region of the object in step S21 will be described later.

[1-4] Description of Processing of Estimating Predicted Presence Region

Description will next be made of the processing of estimating the predicted presence region of the object by the estimation result selecting unit 16. In the estimation processing, the score correcting unit 161 of the estimation result selecting unit 16 may estimate the predicted presence region by one of the following methods or a combination of two or more of the following methods.

(First Method)

An example of a first method will be described first.

As illustrated on the left side of FIG. 17, a case is assumed in which the Faster R-CNN detects, as a rectangular region, a region $s(t_0)=(x(t_0), y(t_0), w(t_0), h(t_0))$ in which there is a dog as an example of an object at $t=t_0$. Incidentally, suppose that $(x(t_0), y(t_0))$ is the central position of the detected region, and that $(w(t_0), h(t_0))$ is the width and height of the detected region. Incidentally, t is a value identifying a time (timing) in the image series of the image data 111, and is assumed to correspond to frames in the following example.

In addition, suppose that regions in which the dog illustrated on the left side of FIG. 17 may be detected at $t=t_0+1$ are limited to regions in a certain range whose center is $s(t_0)=(x(t_0), y(t_0), w(t_0), h(t_0))$ detected at $t=t_0$.

As illustrated on the right side of FIG. 17, for example, a case is assumed in which the dog is detected at $t=t_0+1$. Incidentally, the detected region at time $t=t_0+1$ is expressed as $s(t_0+1)=(x(t_0+1), y(t_0+1), w(t_0+1), h(t_0+1))$.

In this case, when a value of $(\Delta x, \Delta y, \Delta w, \Delta h)=s(t_0+1)-s(t_0)$ is equal to or less than the magnitude of a certain range determined in advance, the score correcting unit 161 may determine that the dog detected at $t=t_0+1$ is the same dog as the dog detected in the previous frame ($t=t_0$).

One of the following (a) to (c) or a combination of two or more of the following (a) to (c) may be used as a method for determining whether or not an object detected in a certain frame is the same as an object detected in a previous frame.

(a) For example, the score correcting unit 161 may set a variable range r of the central position such that $(\Delta x^2+\Delta y_2)^{1/2}<r$, and set variable ranges of the width and height of the region such that $|\Delta w|<\Delta w\_max$ and $|\Delta h|<\Delta h\_max$. Incidentally, the value of r and the values of $\Delta w\_max$ and $\Delta h\_max$ may be values adjustable based on the kind of the detected object, a frame rate at a time of observation, the dimensions (w, h) of the detected rectangular region, and the like. Alternatively, the value of r and the values of Δw_max and Δh_max may be fixed values complying with a given rule.

(b) In addition, the score correcting unit 161 may evaluate the size of an overlap between the detected region of an object in a certain frame and the detected region of the object in a previous frame by an intersection of union (IoU) value, and determine that the same object is detected when the IoU value is equal to or more than a certain threshold value.

(c) Alternatively, the score correcting unit 161 may use a correlation value between pixel values of the region detected at $t=t_0$ and the region detected at $t=t_0+1$.

When the score correcting unit 161 determines that the dog detected at $t=t_0$ and the dog detected at $t=t_0+1$ are the same dog, the score correcting unit 161 may obtain a temporal change ds/dt in x, y, w, h based on the values of (x, y, w, h) detected at $t=t_0$ and $t=t_0+1$, respectively. Here, the temporal change ds/dt is (dx/dt, dy/dt, dw/dt, dh/dt).

In addition, in a case of $t=t_0+2$, the score correcting unit 161 may estimate the value of a predicted region $s(t_0+2|t_0+1)$ at time $t=t_0+2$ by $s(t=t_0+2|t_0+1)=s(t_0+1)+ds/dt \times \Delta t$ using the value of ds/dt obtained in the foregoing. Incidentally, Δt is a time interval between frames. Here, the predicted region $s(t_0+2|t_0+1)$ is $(x(t_0+2|t_0+1), y(t_0+2|t_0+1), w(t_0+2|t_0+1), h(t_0+2|t_0+1))$.

The score correcting unit 161 may output movement information to the Faster R-CNN (obtaining unit 162) based on the value of the predicted region obtained by the foregoing.

Incidentally, the value of a predicted region at $t=t_3$ may be estimated by replacing times $t=t_0$, $t_0+1$, and $t_0+2$ described above with times $t=t_0+1$, $t_0+2$, and $t_0+3$. The estimation is made for $t=t_4$ and subsequent times in the similar manner as above.

(Second Method)

An example of a second method will next be described. In the second method, description will be made of an example of estimating a predicted region using a Kalman Filter uniform motion model.

Figure 18:
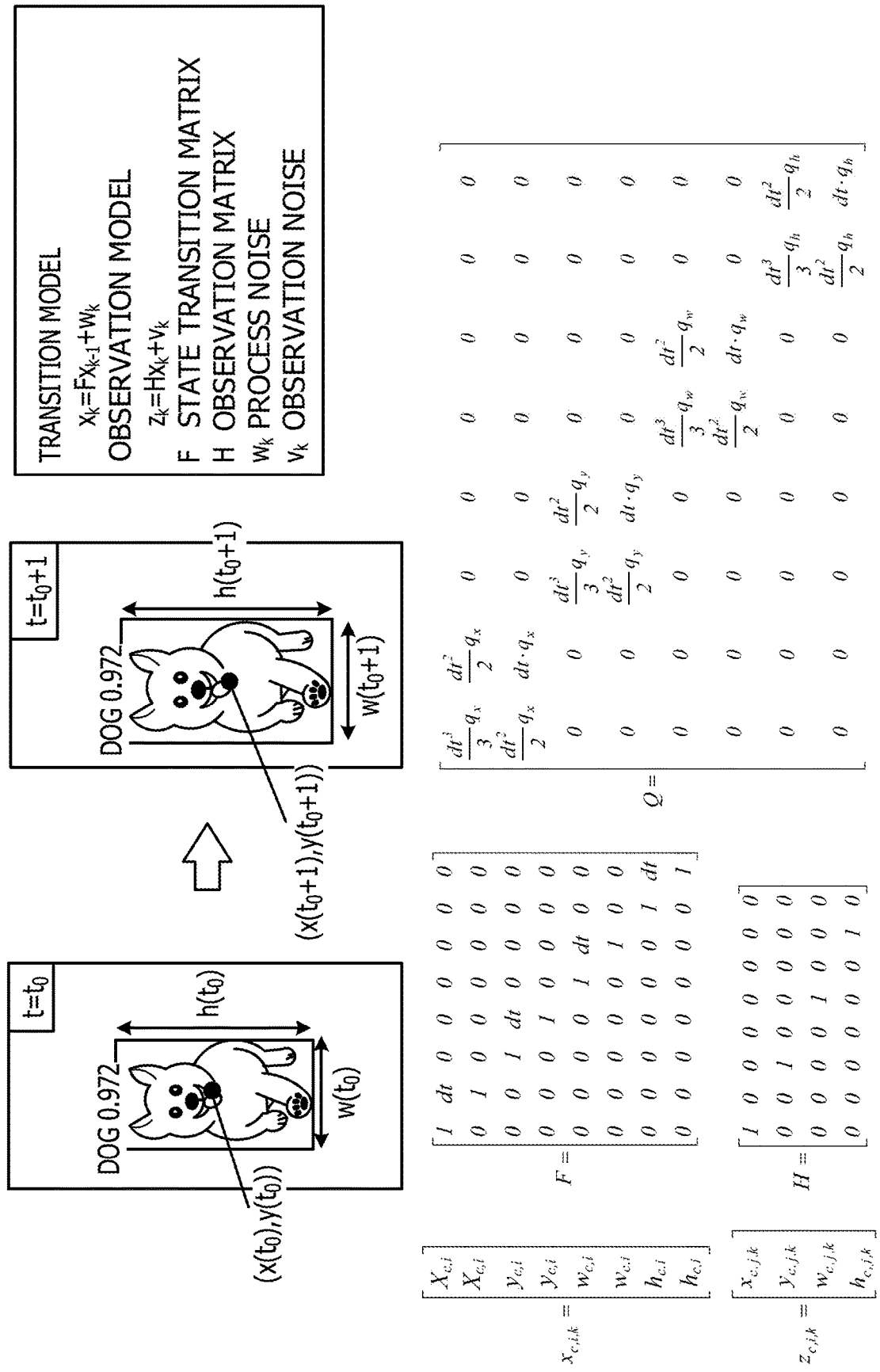
FIG. 18 is a diagram illustrating an example of a second method of the predicted region estimation processing.

The Kalman filter uniform motion model may include a state vector $x_{c,\ i,\ k}$ illustrated in FIG. 18, for example. Incidentally, c in the state vector is a kind of a tracking object, i is identification information (for example, a number) of the tracking object, and k is time (for example, a frame number).

As illustrated in FIG. 18, the score correcting unit 161 may retain, for each tracking object, the state vector $x_{c,\ i,\ k}$ in which the kind c of the object, a presence region (x, y, w, h), and a velocity (x (dot), y (dot), w (dot), h (dot)) are arranged. When there is an object including a detected region close to a predicted position within a four-dimensional observation vector space (x, y, w, h) among objects of a same kind detected by an object detecting NN, the score correcting unit 161 may perform Kalman filter update processing with the detected region as an observed value. Incidentally, as the observed value, an observation vector $z_{c,\ j,\ k}$ illustrated in FIG. 18 may be defined. c in the observation vector is the kind of the detected object, j is identification information (for example, a number) of the detected object, and k is time (for example, a frame number).

Incidentally, as illustrated in FIG. 18, a transition model denoted by "$x_k$" may be expressed by the following Equation (1), and an observation model denoted by "$z_k$" may be expressed by the following Equation (2). Here, "F" in the following Equation (1) is a state transition matrix (see FIG. 18), and "$w_k$" is process noise. In addition, "H" in the following Equation (2) is an observation matrix (see FIG. 18), and "$v_k$" is observation noise.

$$x_k = F x_{k-1} + w_k \quad (1)$$

$$z_k = H x_k + v_k \quad (2)$$

One of the following methods (i) to (iv) may be applied to association between the tracking object and the detected object (Data Association).

(i) a method of using a detected object closest to the predicted position of the tracking object as the observed value used for the Kalman filter update processing (Nearest Neighbor).

(ii) a method of performing the above-described method (i) under a constraint that the tracking object and the detected object are associated with each other on a one-to-one basis (Global Nearest Neighbor).

(iii) a method of taking an average by a weighted sum of assignment candidates, and estimating the state vector of the tracking object (joint probabilistic data association (JPDA)).

(iv) a method of constructing a hypothesis tree of assignment hypotheses over a plurality of frames, and thereafter performing pruning retrospectively (multiple hypothesis tracking (MHT)).

In addition, the following Equations (3) and (4) may be used in the Kalman filter prediction processing. Incidentally, Equation (3) represents a predictive estimated value, and Equation (4) represents a predictive error matrix.

$$\hat{x}_{k|k-1} = F \hat{x}_{k-1|k-1} \quad (3)$$

$$\hat{P}_{k|k-1} = F P_{k-1|k-1} F_k^T + Q \quad (4)$$

When amounts of change in pixel value and pixel length per frame are taken for references as units of amounts of change in central position, width, and height, the score correcting unit 161 may perform calculation with dt=1.

Further, the following Equations (5) to (9) may be used in the Kalman filter update processing. Incidentally, Equation (5) represents the covariance of an observation residual, Equation (6) represents an optimum Kalman gain, Equation (7) represents the observation residual (innovation), Equation (8) represents the estimated value of an updated state, and Equation (9) represents the covariance of an updated error.

$$S_k = R + H P_{k|k-1} H^T \quad (5)$$

$$K_k = P_{k|k-1} H^T S_k^{-1} \quad (6)$$

$$e_k = z_k - H \hat{x}_{k|k-1} \quad (7)$$

$$\tilde{x}_{k|k} = \hat{x}_{k|k-1} + K_k e_k \quad (8)$$

$$P_{k|k} = (I - K_k H) P_{k|k-1} \quad (9)$$

The score correcting unit 161 may change the magnitudes of an initial value $P_{0|0}$ of the predictive error matrix and constants $q_x$ and $q_y$ of a process noise covariance matrix Q (see FIG. 18) and the like according to the kind of the object detected by the object detecting NN, the dimensions (w, h), and the like. Incidentally, the process noise covariance matrix Q is a parameter related to amounts of change of the predicted region.

Thus, the score correcting unit 161 may estimate a moving range of an animal, a vehicle, or the like moving rapidly from an initial position to be a wide range, or estimate a moving range of a near object to be a wide range, so that object tracking and object detection with higher accuracy may be realized. In addition, when a type of object, for example, context information such as "a horse" and "a rider riding on the horse" may be estimated, motion prediction accuracy may be further improved.

Incidentally, because the size of the tracking object changes in each frame, the magnitudes of $q_x$, $q_y$, and the like determining the magnitude of Q may be defined as a function of the dimensions (w, h) of the tracking object.

(Third Method)

An example of a third method will next be described. In the third method, description will be made of an example in which MHT (Multiple Hypothesis Tracking) is used as an example of association between the tracking object and the detected object (Data Association).

The following description will be made of an example in which the following methods (I) and (II) are further applied using MHT in the method of estimating the predicted region of the tracking object using a tracking filter such as the Kalman filter uniform motion model described in the second method.

(I) provision of an observation vector to the tracking filter.
(II) a method of trusting the value of a predicted region obtained, and appropriately setting a determination condition to be applied to a method according to one embodiment.

A method is known which implements tracking of an image feature point using MHT (see Non-Patent Documents 5 and 6, for example).

In the example of the above-described method, the coordinates (x, y) of a corner feature point extracted from an image are set as a target, and association (Data Association) is performed between coordinate positions (x, y) of a plurality of tracking object points estimated by the tracking filter and a plurality of corner feature point positions (x, y).

In one embodiment, as illustrated in FIG. 19, association between a plurality of tracking objects and a plurality of detected objects is performed by extending the above-described method and using four-dimensional coordinates (x, y, w, h) representing an object detection region.

Figure 20:
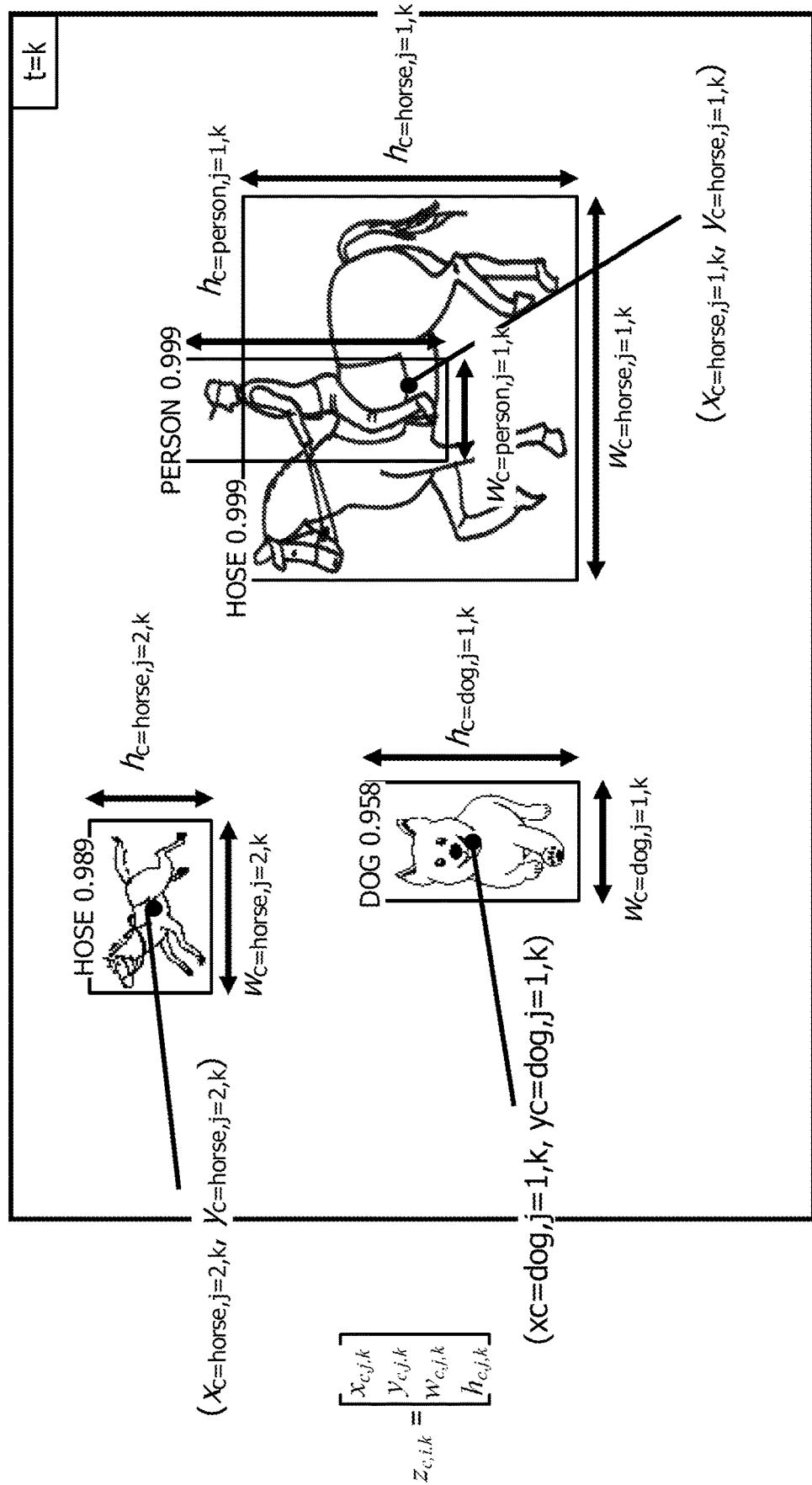
FIG. 20 is a diagram illustrating an example of the third method of the predicted region estimation processing.

A case is assumed in which observation data illustrated in FIG. 20 is obtained, for example. In this case, the score correcting unit 161 may associate a plurality of kinds of tracking objects and detected objects with each other. For example, as illustrated in FIG. 20, a detected object (score: dog 0.958) is associated with a dog as a tracking object, and the coordinates of the detected object are ($x_{c=dog, j=1, k}$, $y_{c=dog, j=1, k}$, $w_{c=dog, j=1, k}$, $h_{c=dog, j=1, k}$).

Figure 21:
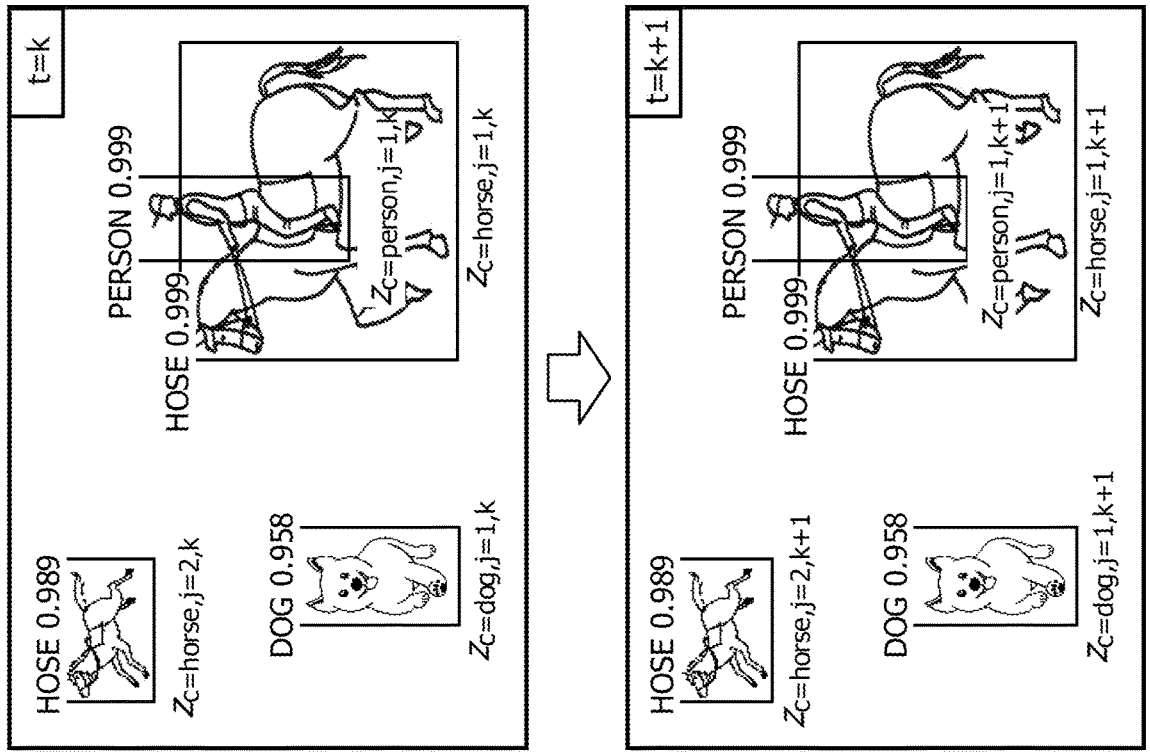
FIG. 21 is a diagram illustrating an example of the third method of the predicted region estimation processing.

As illustrated in FIG. 21, the score correcting unit 161 may obtain a four-dimensional observation vector $z_{c, j, k}$ representing an object detection region (x, y, w, h) for each kind of detected object in each frame.

Each observation vector $z_{c, j, k}$ may be a tracking starting point at which tracking is started from that frame. Incidentally, when the score correcting unit 161 starts tracking, the score correcting unit 161 may set velocity components of the state vector $x_{c, j, k}$ illustrated in an upper part (t=k) in FIG. 21 to "0," and set the value (x, y, w, h) of an observed point as an initial position (x, y, w, h) of the tracking object.

The score correcting unit 161 may estimate, in each frame, the value of the state vector $x_{c, j, k}$ of the tracking object in a latest frame based on the data of an observed point series within a four-dimensional space (x, y, w, h) observed up to a previous frame. The predicted value of the state vector may be estimated by using the calculation equations of the Kalman filter prediction processing as described by using the second method (see Equations (3) and (4)).

Then, the score correcting unit 161 may assign an observed point (x, y, w, h) detected from an image as the observed value of the tracking object. The assigned observed point (detected object) may be limited to only an object of the same kind as the tracking object. For example, the score correcting unit 161 may assign an observed point included in a gate region whose center is the predicted position of the tracking object under a certain condition.

The probability density of a predicted observed position $z_k$ predicted by the Kalman filter of the third method is a multidimensional normal distribution as in the following Equation (10) in a four-dimensional Euclidean space in which parameters (x, y, w, h) of a rectangular region defining an object detection region are axes.

$$f(z_k) = \frac{1}{(2\pi)^2 |S_k|^{1/2}} \exp\left(-\frac{1}{2}[z_k - H\bar{x}_{k;k-1}]^T S_k^{-1}[z_k - H\bar{x}_{k|k-1}]\right) \quad (10)$$

where $S_k$ is the covariance matrix of an observation residual calculated by the following Equation (11) (similar to the foregoing Equation (5)) at time t=k.

$$S_k = R + HP_{k\,k-1}H^T \quad (11)$$

The value of the residual covariance matrix $S_k$ is calculated as a part of the Kalman filter update processing. In this case, however, the value of the residual covariance matrix $S_k$ is used also for a purpose of setting a range of the position of the observed point that may be assigned to the tracking object, for example, the gate region.

Here, R is an observation noise covariance matrix. In a usage scene in which a camera moves, for example, the position of the object also changes according to the movement of the camera. In this case, the score correcting unit 161 may reflect the position of the object, the position depending on the movement of the camera, in the model by increasing the value of the observation noise covariance matrix R. Thus, there is a possibility of being able to improve accuracy of object detection by using a result detected in a past frame.

Incidentally, the term of the following Equation (12) (similar to the foregoing Equation (7)) included in the multidimensional normal distribution of the foregoing Equation (10) is an observation residual. The observation residual indicates a difference between coordinates of a predicted position (see the following Equation (14)) estimated from the predicted value (see the following Equation (13)) of the state vector in a frame at time t=k and an observed point actually observed.

$$e_k = z_k - H\hat{x}_{k\,k-1} \quad (12)$$

$$\text{predicted value} = \hat{x}_{k|k-1} \quad (13)$$

$$\text{predicted position} = H\hat{x}_{k|k-1} \quad (14)$$

The distribution of the observation residual is a distribution reflecting observation noise at a time of observation and process noise at a time of state transition, and is a multidimensional normal distribution as expressed in the foregoing Equation (10) in the model of the third method.

The score correcting unit 161 may set a gate region as a region in which the value of the present probability density function assumes a value equal to or more than a certain threshold value. The gate region may be set as a region in which a value obtained by integrating the above-described probability density function with respect to (x, y, w, h) within the gate region is a certain threshold value, for example, 0.99. Also in this case, the score correcting unit 161 may set the gate region such that the value of the probability density function is uniform in a boundary region that separates the inside of the gate region from the outside of the gate region.

The score correcting unit 161 may set an observed point within the gate region set as described above as an assignment candidate, and assign the observed point to the predicted position.

Incidentally, in the case where a region in which the integrated value of the density function as described above is a certain value (for example, 0.99) is used as the gate region, the gate region is a four-dimensional ellipsoidal region.

Figure 22:
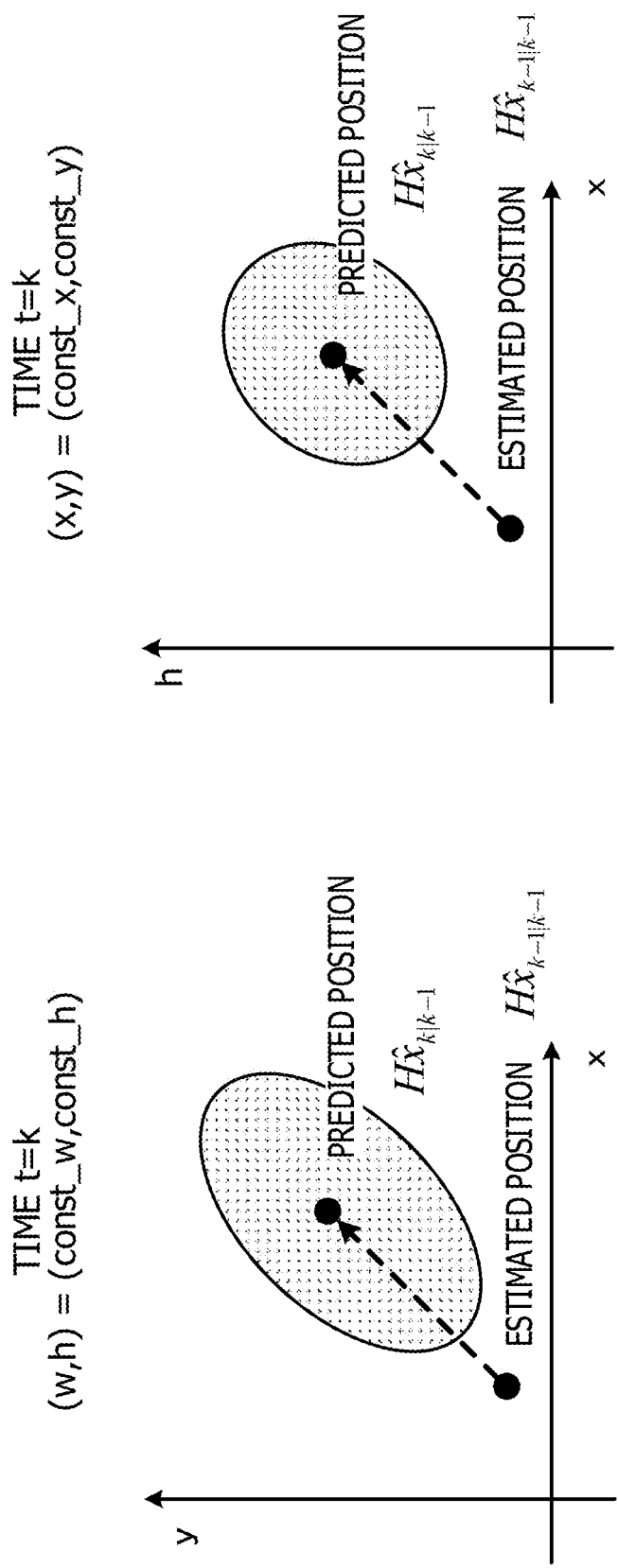
FIG. 22 is a diagram illustrating an example of sections of a gate region.

FIG. 22 illustrates an example of images of sections obtained by fixing this ellipsoid with (w, h)=(const_w, const_h) and (x, y)=(const_x, const_y). FIG. 22 illustrates the inside of the gate region by shading.

The score correcting unit 161 may set an observed point within the gate region set as described above as an assignment candidate, and generate an assignment hypothesis that assigns the observed point to the tracking object.

When the observed point continues to be observed at a position close to the predicted position, the likelihood of the assignment increases. When the likelihood of the assignment exceeds a certain threshold value, the score correcting unit 161 may output movement information to the Faster R-CNN (obtaining unit 162) based on the value of the predicted region obtained.

Incidentally, in MHT, an unobserved event to which no observed point within the gate region is assigned may be an assignment candidate. Tracking may therefore be continued even when the tracking object disappears from view because the tracking object is temporarily hidden behind another object or the like.

The score correcting unit 161 may, for example, generate assignment hypotheses that assign a plurality of tracking objects to a plurality of detected objects according to the framework of MHT. The assignment hypotheses may be generated each time an image of each frame is observed.

Processing of generating a plurality of assignment hypotheses in a latest frame from a plurality of assignment hypotheses generated up to a previous frame is repeatedly performed. The hypothesis tree of the assignment hypotheses therefore becomes large. According to limitations of computing resources such as the memory, processor of the detecting device 1, the score correcting unit 161 may delete assignment hypotheses with low likelihood by performing pruning.

Thus, instead of determining the assignment hypotheses in each frame, hypotheses are generated in multiple stages over a plurality of frames, and the assignment hypotheses are retrospectively determined later. It is therefore possible to realize Data Association robust against noise, occlusion, and the like occurring in each frame.

The detecting device 1 according to one embodiment may detect the position and kind of an object by the Faster R-CNN using the information of the predicted region obtained by the above-described method. Accuracy of object detection may be thereby improved.

(Fourth Method)

In a fourth method, description will be made of an example in which the score correcting unit 161 uses, as observation data, the output (rectangular regions provided with scores) of the object detecting NN before the rectangular regions are narrowed down by the NMS processing. Incidentally, the fourth method may be applied to the second example of the movement information.

Figure 23:
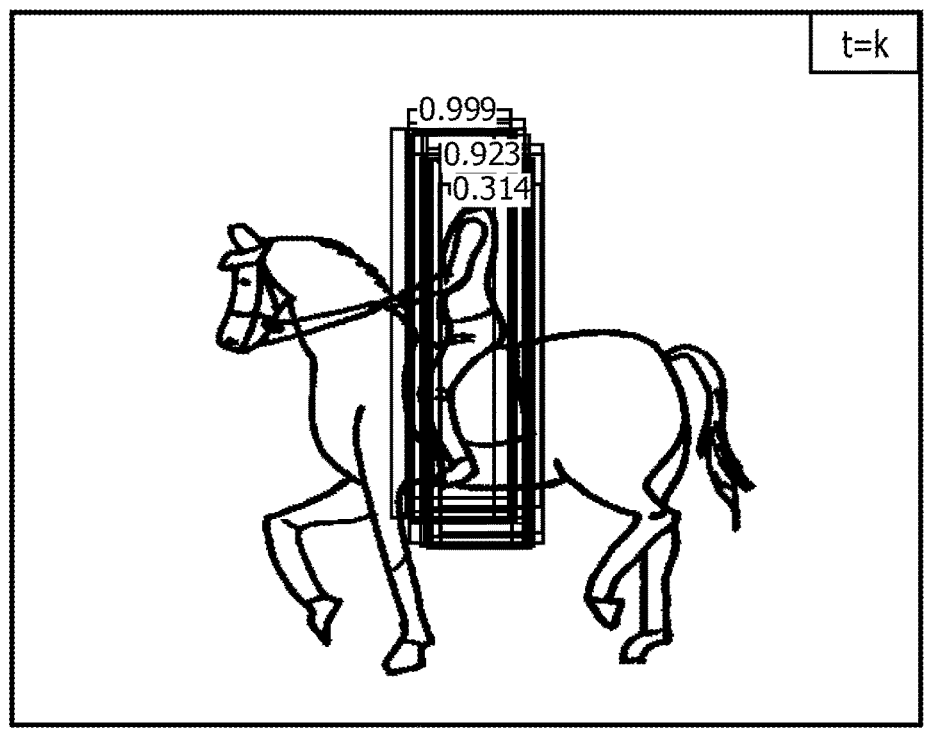
FIG. 23 is a diagram illustrating an example of a fourth method of the predicted region estimation processing.

FIG. 23 is a diagram illustrating an example of detected regions before rectangular regions are narrowed down in a case where a kind of detected object is "person." The detected regions illustrated in FIG. 23 are, for example, output information (detected regions) from the object position and kind estimating unit 15.

Incidentally, as illustrated in FIG. 23, an observation vector corresponding to each rectangular region will be denoted as $z_{c, j, k}$, and a score assigned to each detected region will be denoted as $p_{c, j, k}$. Here, c denotes a kind of detected object, j denotes the number of the detected object, and k denotes time (for example, a frame number).

As in the third method, the score correcting unit 161 may assign a plurality of observed points (detected regions) observed in each frame to tracking objects.

Incidentally, in the fourth method, a large number of observed points (detected object candidate regions as illustrated in FIG. 23) observed around a detection target in each frame are assigned to the tracking object before the observed points are narrowed down as a detection result with a small overlap.

When the likelihood of assignment of the Data Association system such as MHT is calculated, the score correcting unit 161 may consider the values of scores $p_{c, j, k}$ of detection candidate regions as well as the probability density of the observed points (rectangular regions) as in the foregoing Equation (10) expected from the motion of the tracking object. An expression such as $p_{c, j, k} \cdot f(z_{c, j, k})$ may be used as the likelihood in which the scores of the candidate regions are considered.

Incidentally, a process of generating the assignment hypotheses within the observed point space as described above may be positioned as processing of associating predicted regions estimated from detected regions up to a previous frame with detected regions in a latest frame (association of observed regions).

Figure 24:
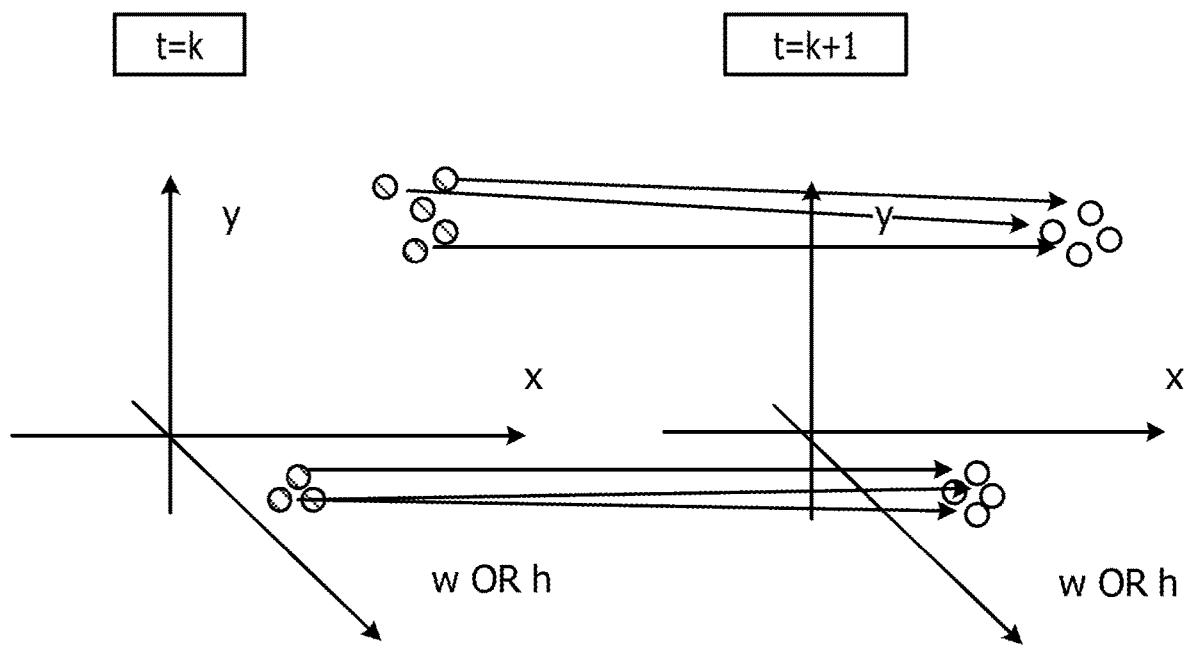
FIG. 24 is a diagram of assistance in explaining an example of association of observed points in a four-dimensional Euclidean space.

FIG. 24 is a diagram illustrating such association of the observed regions as the association of observed points in a four-dimensional Euclidean space. FIG. 24 illustrates a diagram of a three-dimension image in which one of a w-axis and an h-axis is omitted.

Figure 25:
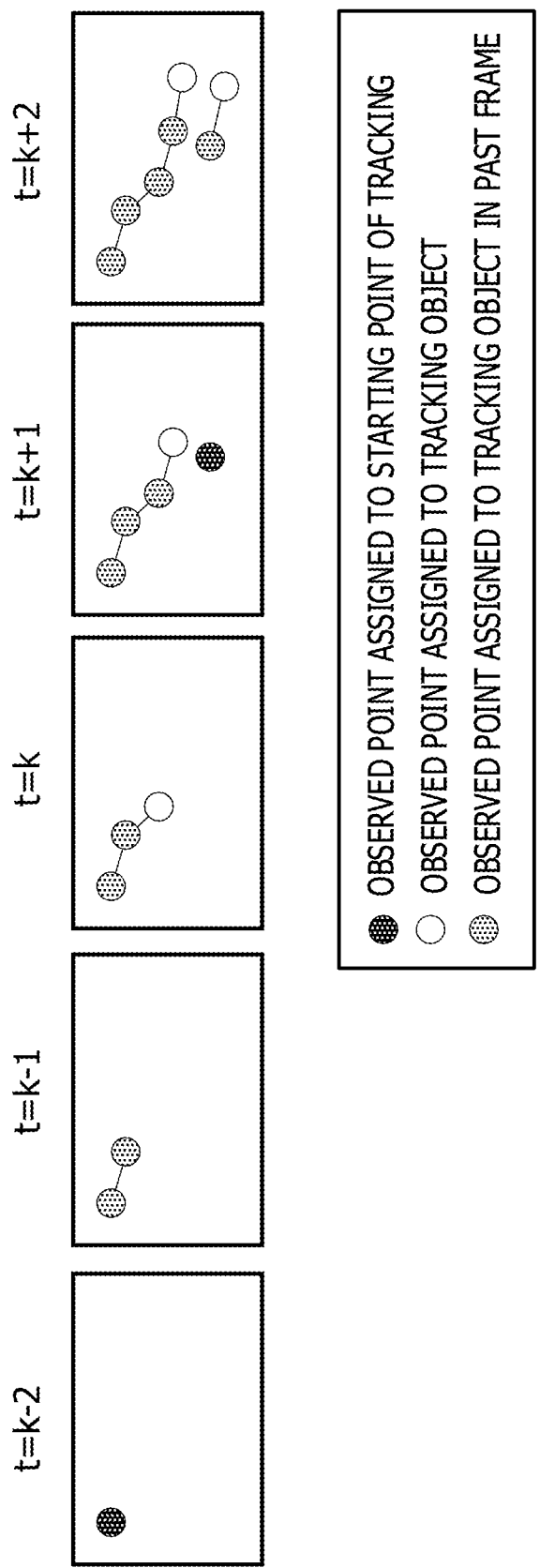
FIG. 25 is a diagram of assistance in explaining an example of a method of assigning a plurality of observed points observed in each frame to tracking objects.

FIG. 25 is a diagram illustrating an example of a method of assigning a plurality of observed points (detected regions) observed in each frame to tracking objects by using MHT. In FIG. 25, two observed points are observed at t=k+1, and one observed point is observed at other times. Incidentally, FIG. 25 illustrates a diagram of a two-dimensional image rather than a four-dimensional image.

Figure 26:
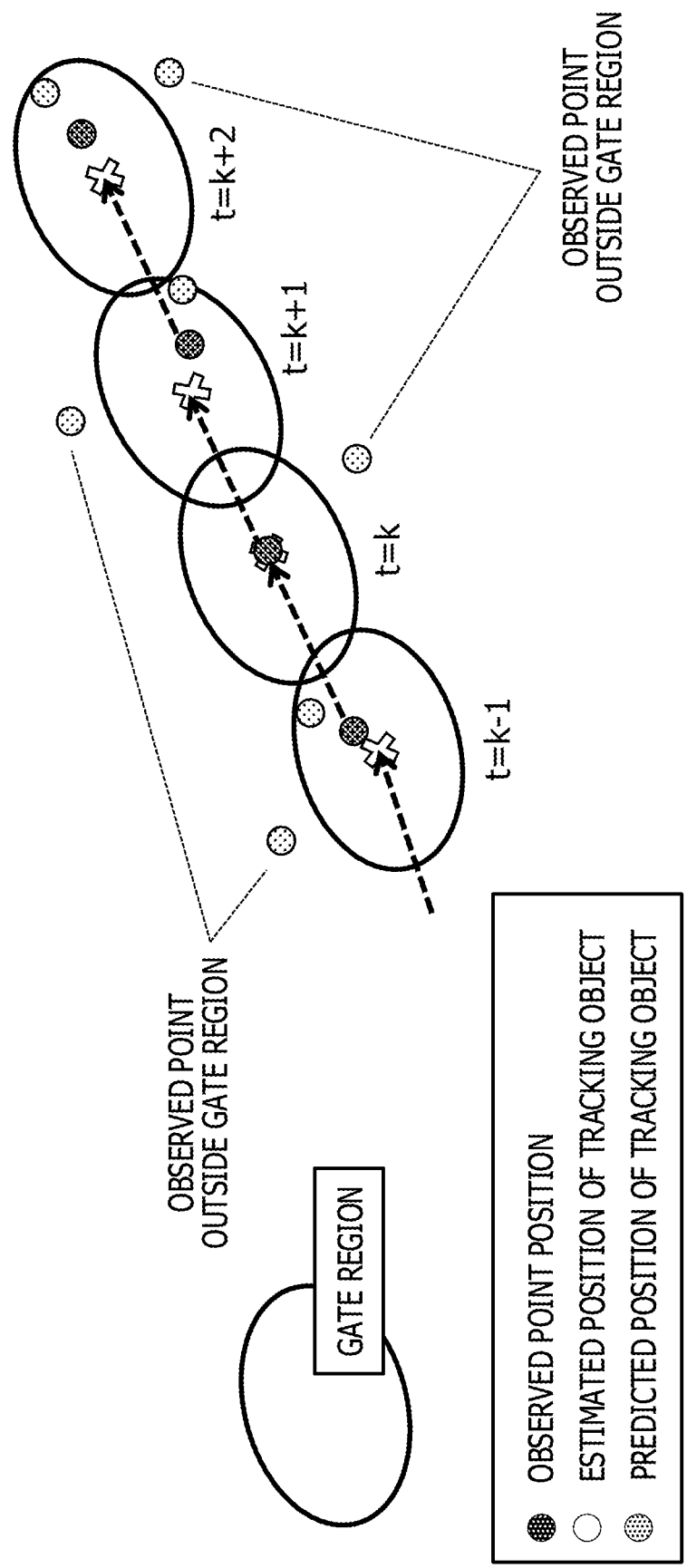
FIG. 26 is a diagram of assistance in explaining an example of assignment of a hypothesis to an unobserved event and Kalman filter prediction and update processing.

FIG. 26 is a diagram of assistance in explaining assignment of a hypothesis to an unobserved event by MHT and Kalman filter prediction and update processing. FIG. 26 illustrates an example of calculation of the predicted position, estimated position, observed point position, and gate region of a tracking object by the tracking filter in a case where one observed point is included in the gate region. It is clear from FIG. 26 that the observed point within the gate region is assigned to the tracking object by MHT.

In the example of FIG. 26, an observed point is assigned in a frame at times t=k−1, k+1, and k+2, and an unobserved event is assigned in a frame at time t=k. Incidentally, only the observed point within the gate region among observed points within an image may be an assignment candidate. In addition, when the observed point is assigned, the estimated position of the tracking object may be corrected to the observed point position side as compared with the predicted position.

Figure 27:
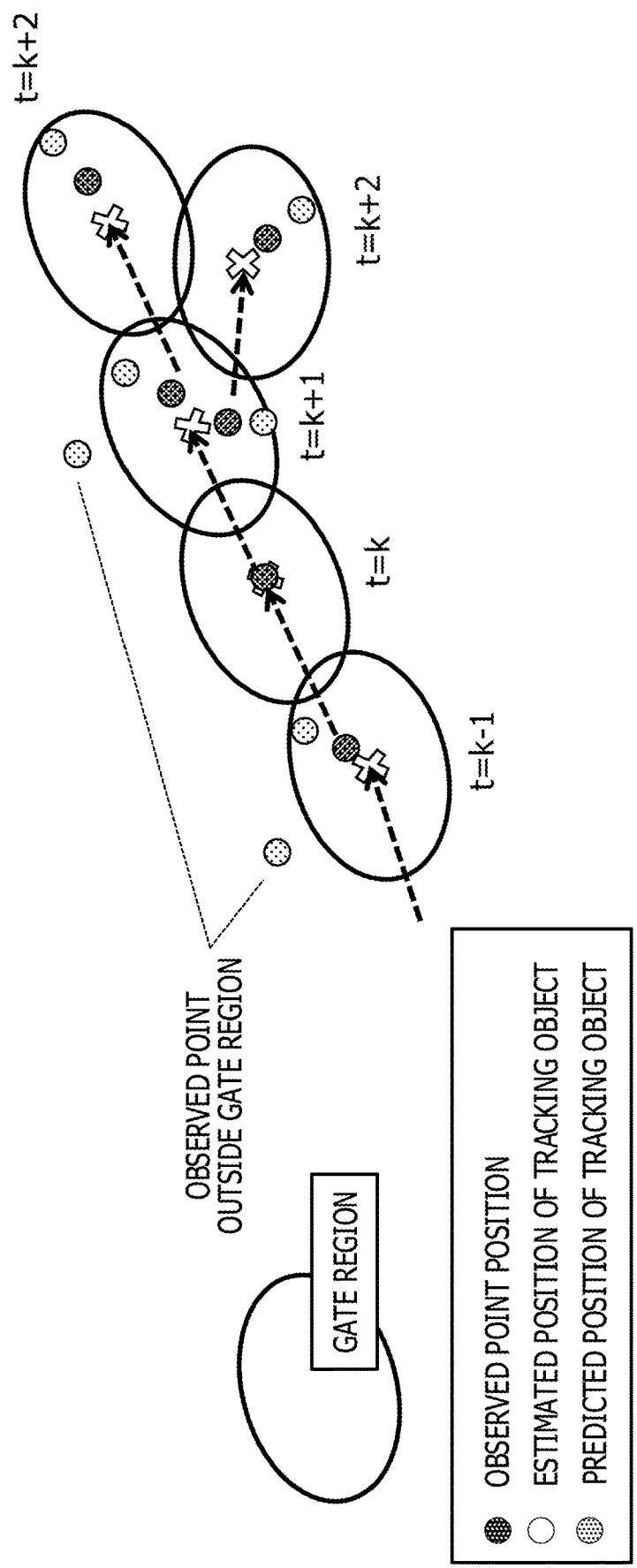
FIG. 27 is a diagram of assistance in explaining an example of assignment of a hypothesis to an unobserved event and Kalman filter prediction and update processing.

FIG. 27 is a diagram of assistance in explaining assignment of a hypothesis to an unobserved event by MHT and Kalman filter prediction and update processing. FIG. 27 illustrates an example of calculation of the predicted position, estimated position, observed point position, and gate region of a tracking object by the tracking filter in a case where a plurality of observed points are observed in the gate region, and the tracking hypothesis branches.

In the example of FIG. 27, one observed point is assigned at time t=k−1, an unobserved event is assigned at t=k, and two observed points are assigned at t=k+1. In addition, one observed point is assigned to each of tracking hypotheses after branching at time t=k+2.

Incidentally, the methods described with reference to FIGS. 24 to 27 are also applicable to the third method.

Figure 28:
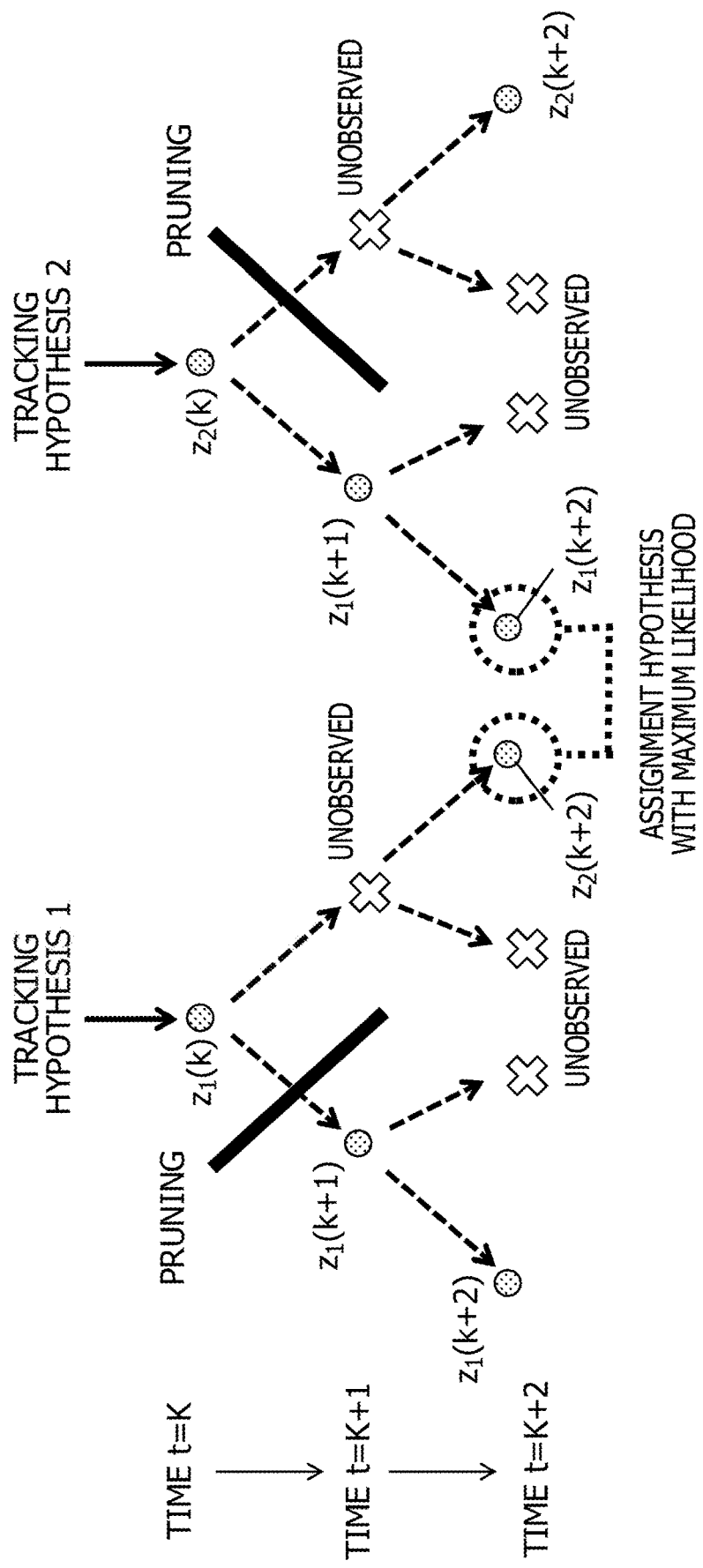
FIG. 28 is a diagram of assistance in explaining an example of generation and pruning of hypotheses over a plurality of frames.

FIG. 28 is a diagram of assistance in explaining an example of generation and pruning of hypotheses over a plurality of frames by MHT. The score correcting unit 161 may repeatedly generate assignment hypotheses over a plurality of frames. At this time, the score correcting unit 161 may select hypotheses in which likelihood of a combination of assignment hypotheses is highest as an estimation result from a latest hypothesis tree. Incidentally, the hypothesis tree may be pruned in appropriate timing according to limitations of computing resources such as a memory and a processor.

In the example of FIG. 28, hypotheses in which likelihood of a combination of assignment hypotheses is a maximum are used as an estimation result. For example, the score correcting unit 161 may use an N-Scanback algorithm. The N-Scanback algorithm selects assignment hypotheses with maximum likelihood at a present time, determines hypotheses preceding by N−1 frames (N=2 in the example of FIG. 28), and prunes hypothesis trees having other nodes in an (N−1)th frame as starting points.

The score correcting unit 161 may generate movement information based on the plurality of tracking hypotheses obtained by the fourth method described above, and output the movement information to the obtaining unit 162.

Incidentally, unlike observed points assigned in ordinary MHT, the fourth method uses, as the observed points, a plurality of detection candidate regions (for example, detected regions) provided with scores, the detection candidate regions being to be subsequently narrowed down by other processing (for example, the NMS processing).

Therefore, there is a possibility of many detected regions being estimated. Accordingly, the detecting device 1 may narrow down the detected regions by the following method (A) or (B) or a combination of the methods (A) and (B).

(A) The score correcting unit 161 generates correction information for correcting the scores of detected regions by using the likelihood of the tracking hypotheses obtained by the above-described method. Based on the correction information from the score correcting unit 161, in the NMS processing of the obtaining unit 162, a determination is made such that the score of a hypothesis (candidate region) with maximum likelihood is increased, and candidate regions are narrowed down.

(B) The score correcting unit 161 uses the value of a region (for example, output of the obtaining unit 162 in relation to a previous frame) narrowed down through the NMS processing or the like as (x, y, w, h) serving as a starting point of tracking hypothesis generation, and thereafter repeats the generation of assignment hypotheses according to the fourth method. Incidentally, the score correcting unit 161 assumes that tracking hypotheses branching from one certain common starting point correspond to only one tracking object, and selects a tracking hypothesis with a highest likelihood as an estimation result. At this time, in order to avoid an overlap between an observed point as the starting point of tracking and the observation result of a tracking continuation object, the score correcting unit 161 may remove detection candidate regions in the vicinity of the tracking continuation object by applying the following methods (B-1) and (B-2). Incidentally, the starting point of tracking is, for each object, a frame in which the object is first detected, for example.

(B-1) The score correcting unit 161 may remove regions having a large overlap with an estimation result obtained as a result of tracking or a detection candidate region selected as a region with highest assignment likelihood (these are also set as a detection result).

(B-2) In addition, the score correcting unit 161 may remove detection candidate regions included in the gate region of a tracking hypothesis during continuation of tracking.

In addition, in (B), the obtaining unit 162 may apply narrowing-down processing such as the NMS processing to candidate regions remaining as a result of the above processing by the score correcting unit 161. Incidentally, suppose that a region detected after the narrowing-down processing is performed becomes a starting point of tracking by the score correcting unit 161.

Incidentally, in the processing according to the fourth method described above, the obtaining unit 162 may take a weighted mean of detection candidate regions in the vicinity of a detected object.

For example, the score correcting unit 161 may output, as movement information, at least one piece of information among the "distances from the predicted position," the "Mahalanobis distance," "the scores of the detected regions," and the "likelihood of tracking" to the proposed region calculating unit 14. Incidentally, the "Mahalanobis distance" may be defined by the following term (15) in the foregoing Equation (10), for example.

$$[z_k - H\hat{x}_{k\ k-1}]^T S_k^{-1} [z_k - H\hat{x}_{k\ k-1}] \quad (15)$$

The obtaining unit 162 may calculate the weighted mean based on the movement information from the score correcting unit 161 for detection candidate regions within the gate region having, as a center thereof, the predicted region calculated by using the tracking filter.

Incidentally, the score correcting unit 161 may use MHT at a time of a start of tracking, and use joint probabilistic data association (JPDA) after the tracking is continued to a certain extent.

In addition, the score correcting unit 161 may raise a threshold value of object detection at a time of a start of tracking, and generate correction information for making correction so as to lower the threshold value of object detection for a region in which likelihood has exceeded a certain threshold value after the tracking is continued, for example. In other words, the obtaining unit 162 may calculate the weighted mean corresponding to the duration of the tracking for the threshold value of object detection. Thus, even when a region in which likelihood has exceeded the certain threshold value after the tracking is continued is hidden behind another region (object) in a certain frame, for example, accuracy of object detection may be improved by using information tracked from frames in the past.

Alternatively, as another method, detection candidate regions within the gate region having, as a center thereof, the predicted region (four-dimensional coordinate system of (x, y, w, h)) calculated using the tracking filter may be assigned scores corrected by performing weighting. The weighting may be performed based on weight information as an example of movement information, for example, weights such as the "distances from the predicted position," the "Mahalanobis distance," the "scores of the detected regions," or the "likelihood of tracking,"." In other words, the score correcting unit 161 may be said to perform weighting based on the movement information for indexes of candidate regions present within the gate region having, as a center thereof, a region in which an object may be present in an input image to be input next, the region being obtained by the tracking filter.

Incidentally, a result of calculation of the weighted mean from the obtaining unit 162 may be stored in the memory unit 17 as the recognition result 171, which is the output from the estimation result selecting unit 16.

As described above, the obtaining unit 162 may be said to perform processing of calculating the weighted mean of a plurality of candidate regions of a plurality of sets based on respective indexes of the plurality of sets.

[1-5] Example of Hardware Configuration

An example of hardware configuration of the detecting device 1 will next be described. Incidentally, as described above, the detecting device 1 may be illustratively implemented by a computer system including one or more computers. The one or more computers constituting the detecting device 1 will be described as a computer 10, and an example of hardware configuration of the computer 10 will be described.

Figure 29:
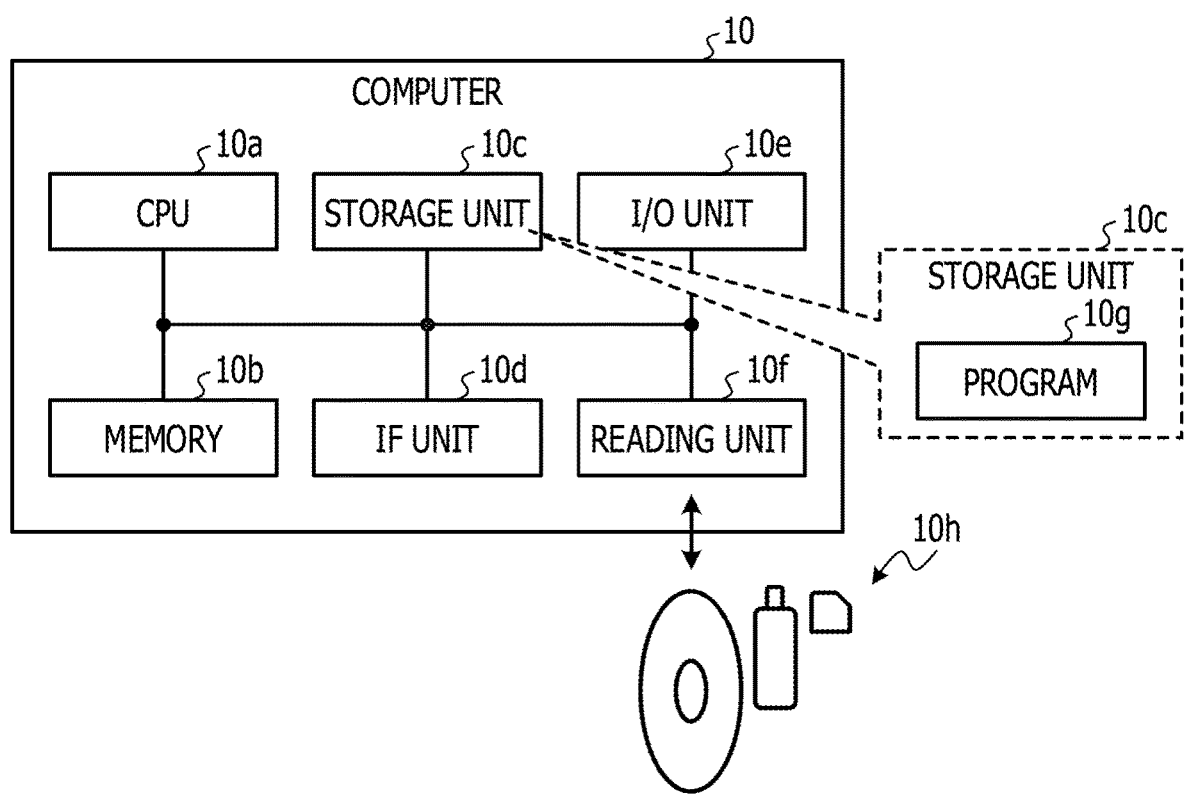
FIG. 29 is a block diagram illustrating an example of a hardware configuration of a computer.

As illustrated in FIG. 29, the computer 10 as an example of an information processing device may illustratively include a processor 10a, a memory 10b, a storage unit 10c, an interface (IF) unit 10d, an input/output (I/O) unit 10e, and a reading unit 10f.

The processor 10a is an example of an arithmetic processing device that performs various kinds of control and operation. The processor 10a may be mutually communicatably coupled to each of the blocks 10b to 10f by a bus 10i. An integrated circuit (IC) such as a CPU, a GPU, an MPU, a DSP, an ASIC, or a PLD (for example, an FPGA) may be used as the processor 10a. Incidentally, the CPU is an abbreviation of central processing unit, the GPU is an abbreviation of graphics processing unit, and the MPU is an abbreviation of micro processing unit. The DSP is an abbreviation of digital signal processor, and the ASIC is an abbreviation of application specific integrated circuit. The PLD is an abbreviation of programmable logic device, and the FPGA is an abbreviation of field programmable gate array.

The memory 10b is an example of hardware that stores various kinds of data and programs. Cited as the memory 10b is a volatile memory, for example, a RAM such as a dynamic RAM (DRAM). Incidentally, the RAM is an abbreviation of random access memory.

The storage unit 10c is an example of hardware that stores various kinds of data and programs or the like. For example, the storage unit 10c may be used as a secondary storage device of the computer 10, and may store programs such as an operating system (OS), firmware, and applications and various kinds of data. Cited as the storage unit 10c are, for example, various kinds of storage devices including a magnetic disk device such as a hard disk drive (HDD), a semiconductor drive device such as a solid state drive (SSD), a nonvolatile memory, and the like. Cited as the nonvolatile memory are, for example, a flash memory, a storage class memory (SCM), a read only memory (ROM), and the like. The storage unit 10c may store a program 10g that implements the whole or a part of various functions of the computer 10.

The IF unit 10d is an example of a communication interface that performs control or the like of coupling and communication with another device via a network not illustrated. Cited as the IF unit 10d are, for example, adapters complying with Ethernet (registered trademark), optical communication (for example, Fibre Channel), and the like. Incidentally, the computer 10 may include a communication interface that performs control or the like of coupling and communication with a managing terminal of an administrator, and may download the program 10g from the network not illustrated, by using the communication interface.

The I/O unit 10e may, for example, include at least one of an input device such as a mouse, a keyboard, a touch panel, or an operating button and an output device such as a display, a projector, or a printer.

[2] Others

The technology according to the foregoing one embodiment may be modified, changed, and carried out as follows.

For example, in the detecting device 1 illustrated in FIG. 1, the functions of the image preprocessing unit 12 to the estimation result selecting unit 16 may be integrated in an arbitrary combination, or one of the functions may be divided into a plurality of functions.

In addition, in a case where the score correcting unit 161 is capable of detecting the attitude of a detected object, the score correcting unit 161 may use attitude information in the processing of estimating a predicted region. There is a small possibility that an animal in an attitude of standing still, for example, suddenly moving greatly from a previous position, whereas an animal running or jumping is expected to move greatly from a previous position.

Further, the score correcting unit 161 may use the information of a traveling direction expected from the orientation of an object such as a vehicle or an animal in the processing of estimating a predicted region.

Incidentally, the attitude information and the information of the traveling direction may be estimated by another method than an object detecting network (for example, the Faster R-CNN). In other words, the score correcting unit 161 may include a network different from the object detecting network.

In addition, the recognition processing in object detection, for example, the recognition result 171 provided by the detecting device 1 may be used to label learning data for object detection. In a case where the Faster R-CNN is made to learn kinds of objects, for example, labels indicating the kinds of the objects are manually input in each frame to make the Faster R-CNN learn. However, there is a possibility of being able to reduce the labor of the input in each frame when the recognition result 171 may be utilized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A control method comprising:
executing first processing that includes estimating, in a first image within an image series, a plurality of sets including candidate regions and indexes according to image feature quantities of the first image, the candidate regions being regions in which presence of an object is estimated within the first image, the indexes being values indicating possibilities of the presence of the object in the candidate regions;
executing second processing that includes obtaining movement information about movement of the object from the image series; and
executing third processing that includes
correcting the candidate regions and the indexes in the plurality of sets estimated by the first processing based on the movement information obtained by the second processing when determining a position of the object in the first image by using the candidate regions and the indexes in the plurality of sets estimated by the first processing, and
determining the position of the object in the first image based on the plurality of sets including the corrected candidate regions and the corrected indexes.

2. The control method according to claim 1,
wherein for each of a plurality of images temporally preceding the first image within the image series, the first processing, the second processing, and the third processing are performed in each of the images, and
wherein the second processing is configured to
obtain the position of the object recognized as an identical object based on the position of the object in each of the images, the position of the object in each of the images being determined by the third processing for each of the plurality of preceding images, and
obtain the movement information based on a temporal change in the position of the object.

3. The control method according to claim 1,
wherein the third processing is configured to narrow down the plurality of sets to a given number of sets based on the respective indexes of the plurality of sets, and
wherein the movement information includes correction information that corrects the index of a particular candidate region among a plurality of the candidate regions as processing targets of the narrowing-down processing.

4. The control method according to claim 1,
wherein the third processing is configured to calculate a weighted mean of a plurality of the candidate regions of the plurality of sets based on the respective indexes of the plurality of sets, and
wherein the movement information includes weight information of each of the plurality of the candidate regions as processing targets of the processing of calculating the weighted mean.

5. The control method according to claim 1,
wherein a plurality of reference regions are fixedly arranged in the first image, and
wherein the first processing is configured to estimate the plurality of sets of the candidate regions and the indexes based on regions formed by the respective plurality of reference regions, or regions formed by combinations of the plurality of reference regions.

6. The control method according to claim 1,
wherein the second processing is configured to obtain the movement information based on a motion model using a tracking filter.

7. The control method according to claim 6,
wherein the second processing includes
obtaining a first region in which the object is possibly present in the first image, the first region being obtained by the tracking filter, and
performing weighting based on the movement information, the weighting being performed on the index of a candidate region that is present inside a gate region having the first region as a center of the gate region.

8. A non-transitory computer-readable storage medium for storing a control program that causes a computer to execute a process, the process comprising:
executing first processing that includes estimating, in a first image within an image series, a plurality of sets including candidate regions and indexes according to image feature quantities of the first image, the candidate regions being regions in which presence of an object is estimated within the first image, the indexes being values indicating possibilities of the presence of the object in the candidate regions;
executing second processing that includes obtaining movement information about movement of the object from the image series; and
executing third processing that includes
correcting the candidate regions and the indexes in the plurality of sets estimated by the first processing based on the movement information obtained by the second processing when determining a position of the object in the first image by using the candidate regions and the indexes in the plurality of sets estimated by the first processing, and
determining the position of the object in the first image based on the plurality of sets including the corrected candidate regions and the corrected indexes.

9. The non-transitory computer-readable storage medium according to claim 8,
wherein for each of a plurality of images temporally preceding the first image within the image series, the first processing, the second processing, and the third processing are performed in each of the images, and
wherein the second processing is configured to
obtain the position of the object recognized as an identical object based on the position of the object in each of the images, the position of the object in each of the images being determined by the third processing for each of the plurality of preceding images, and
obtain the movement information based on a temporal change in the position of the object.

10. The non-transitory computer-readable storage medium according to claim 8,
wherein the third processing is configured to narrow down the plurality of sets to a given number of sets based on the respective indexes of the plurality of sets, and
wherein the movement information includes correction information that corrects the index of a particular candidate region among a plurality of the candidate regions as processing targets of the narrowing-down processing.

11. The non-transitory computer-readable storage medium according to claim 8, wherein the third processing is configured to calculate a weighted mean of a plurality of the candidate regions of the plurality of sets based on the respective indexes of the plurality of sets, and wherein the movement information includes weight information of each of the plurality of the candidate regions as processing targets of the processing of calculating the weighted mean.

12. The non-transitory computer-readable storage medium according to claim 8, wherein a plurality of reference regions are fixedly arranged in the first image, and wherein the first processing is configured to estimate the plurality of sets of the candidate regions and the indexes based on regions formed by the respective plurality of reference regions, or regions formed by combinations of the plurality of reference regions.

13. The non-transitory computer-readable storage medium according to claim 8, wherein the second processing is configured to obtain the movement information based on a motion model using a tracking filter.

14. The non-transitory computer-readable storage medium according to claim 13, wherein the second processing includes obtaining a first region in which the object is possibly present in the first image, the first region being obtained by the tracking filter, and performing weighting based on the movement information, the weighting being performed on the index of a candidate region that is present inside a gate region having the first region as a center of the gate region.

15. A control apparatus comprising:

a memory; and a processor coupled to the memory and configured to execute first processing that includes estimating, in a first image within an image series, a plurality of sets including candidate regions and indexes according to image feature quantities of the first image, the candidate regions being regions in which presence of an object is estimated within the first image, the indexes being values indicating possibilities of the presence of the object in the candidate regions;

execute second processing that includes obtaining movement information about movement of the object from the image series; and execute third processing that includes correcting the candidate regions and the indexes in the plurality of sets estimated by the first processing based on the movement information obtained by the second processing when determining a position of the object in the first image by using the candidate regions and the indexes in the plurality of sets estimated by the first processing, and determining the position of the object in the first image based on the plurality of sets including the corrected candidate regions and the corrected indexes.

16. The control apparatus according to claim 15, wherein for each of a plurality of images temporally preceding the first image within the image series, the first processing, the second processing, and the third processing are performed in each of the images, and wherein the second processing is configured to obtain the position of the object recognized as an identical object based on the position of the object in each of the images, the position of the object in each of the images being determined by the third processing for each of the plurality of preceding images, and obtain the movement information based on a temporal change in the position of the object.

17. The control apparatus according to claim 15, wherein the third processing is configured to narrow down the plurality of sets to a given number of sets based on the respective indexes of the plurality of sets, and wherein the movement information includes correction information that corrects the index of a particular candidate region among a plurality of the candidate regions as processing targets of the narrowing-down processing.

18. The control apparatus according to claim 15, wherein the third processing is configured to calculate a weighted mean of a plurality of the candidate regions of the plurality of sets based on the respective indexes of the plurality of sets, and wherein the movement information includes weight information of each of the plurality of the candidate regions as processing targets of the processing of calculating the weighted mean.

19. The control apparatus according to claim 15, wherein a plurality of reference regions are fixedly arranged in the first image, and wherein the first processing is configured to estimate the plurality of sets of the candidate regions and the indexes based on regions formed by the respective plurality of reference regions, or regions formed by combinations of the plurality of reference regions.

* * * * *